ADAPTIVELY CODED DATA COMMUNICATIONS SYSTEM

Filed Aug. 15, 1966 21 Sheets-Sheet 1

INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

| BIT POSITION | WORD ONE | WORD TWO | WORD THREE |
|---|---|---|---|
| 1 | 1 | 1 | 0 |
| 2 | 0 | 1 | 0 |
| 3 | 0 | 0 | 0 |
| 4 | 0 | 0 | 1 |
| 5 | 1 | 0 | 1 |
| 6 | 0 | 0 | 0 |
| 7 | 0 | 1 | 0 |
| 8 | 0 | 1 | 0 |
| 9 | 1 | 1 | 0 |
| 10 | 0 | 0 | 0 |
| 11 | 0 | 0 | 1 |
| 12 | 0 | 1 | 0 |
| 13 | 1 | 0 | 1 |
| 14 | 0 | 1 | 0 |
| 15 | 0 | 0 | 1 |

| BIT POSITION | WORD ONE | WORD TWO | WORD THREE |
|---|---|---|---|
| 1 | 1 | 1 | 0 |
| 2 | 0 | 1 | 0 |
| 3 | 0 | 0 | 0 |
| 4 | 0 | 0 | 1 |
| 5 | 1 | 0 | 1 |
| 6 | 0 | 0 | 0 |
| 7 | 0 | 1 | 0 |
| 8 | 0 | 1 | 0 |
| 9 | 1 | 1 | 0 |
| 10 | 0 | 0 | 0 |
| 11 | 0 | 0 | 1 |
| 12 | 0 | 1 | 0 |
| 13 | 1 | 0 | 1 |
| 14 | 0 | 1 | 0 |
| 15 | 0 | 0 | 1 |
| 16 | 1 | 0 | 0 |
| 17 | 1 | 1 | 0 |
| 18 | 0 | 1 | 1 |
| 19 | 1 | 0 | 0 |
| 20 | 0 | 0 | 0 |
| 21 | 1 | 1 | 0 |

INVENTORS
NORMAN ABRAMSON
LAWRENCE LUTZKER

BY Dressler, Goldsmith, Clement & Gordon
ATTORNEYS

WORDS 1&2&3 (a=3)

1 - 1
2 - 0
3 - 0
4 - 0
5 - 1
6 - 0
7 - 0
8 - 0
9 - 1
10 - 0
11 - 0
12 - 0
13 - 1
14 - 0
15 - 0
16 - 1
17 - 1
18 - 0
19 - 0
20 - 0
21 - 0
22 - 1
23 - 1
24 - 1
25 - 0
26 - 0
27 - 1
28 - 0
29 - 1
30 - 0
31 - 0
32 - 0
33 - 0
34 - 1
35 - 1
36 - 0
37 - 0
38 - 0
39 - 0
40 - 0
41 - 1
42 - 0
43 - 1
44 - 0
45 - 1

INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

Filed Aug. 15, 1966 21 Sheets-Sheet 4

Fig. 6A

ORIGINAL WORD ONE - 100010001000100

| TIME | INPUT | REGISTER | BUFFER |
|---|---|---|---|
| 0 | 0 | 000000 | 000000000000000000000 |
| 1 | 1 | 110010 | 100000000000000000000 |
| 2 | 0 | 011001 | 010000000000000000000 |
| 3 | 0 | 111110 | 001000000000000000000 |
| 4 | 0 | 011111 | 000100000000000000000 |
| 5 | 1 | 001111 | 100010000000000000000 |
| 6 | 0 | 110101 | 010001000000000000000 |
| 7 | 0 | 101000 | 001000100000000000000 |
| 8 | 0 | 010100 | 000100010000000000000 |
| 9 | 1 | 111000 | 100010001000000000000 |
| 10 | 0 | 011100 | 010001000100000000000 |
| 11 | 0 | 001110 | 001000100010000000000 |
| 12 | 0 | 000111 | 000100010001000000000 |
| 13 | 1 | 000011 | 100010001000100000000 |
| 14 | 0 | 110011 | 010001000100010000000 |
| 15 | 0 | 101011 | 001000100010001000000 |
| 16 | 1 | 010101 | 100100010001000100000 |
| 17 | 1 | 001010 | 110010001000100010000 |
| 18 | 0 | 000101 | 011001000100010001000 |
| 19 | 1 | 000010 | 101100100010001000100 |
| 20 | 0 | 000001 | 010110010001000100010 |
| 21 | 1 | 000000 | 101011001000100010001 |

WORD ONE ENCODED - 100010001000100110101

Fig. 6B

ORIGINAL WORD TWO - 110000111001010

| TIME | INPUT | REGISTER | BUFFER |
|---|---|---|---|
| 0 | 0 | 000000 | 000000000000000000000 |
| 1 | 1 | 110010 | 100000000000000000000 |
| 2 | 1 | 101011 | 110000000000000000000 |
| 3 | 0 | 100111 | 011000000000000000000 |
| 4 | 0 | 100001 | 001100000000000000000 |
| 5 | 0 | 100010 | 000110000000000000000 |
| 6 | 0 | 010001 | 000011000000000000000 |
| 7 | 1 | 001000 | 100001100000000000000 |
| 8 | 1 | 110110 | 110000110000000000000 |
| 9 | 1 | 101001 | 111000011000000000000 |
| 10 | 0 | 100110 | 011100001100000000000 |
| 11 | 0 | 010011 | 001110000110000000000 |
| 12 | 1 | 001001 | 100111000011000000000 |
| 13 | 0 | 110110 | 010011100001100000000 |
| 14 | 1 | 101001 | 101001110000110000000 |
| 15 | 0 | 100110 | 010100111000011000000 |
| 16 | 0 | 010011 | 001010011100001100000 |
| 17 | 1 | 001001 | 100101001110000110000 |
| 18 | 1 | 000100 | 110010100111000011000 |
| 19 | 0 | 000010 | 011001010011100001100 |
| 20 | 0 | 000001 | 001100101001110000110 |
| 21 | 1 | 000000 | 100110010100111000011 |

WORD TWO ENCODED - 110000111001010011001

Fig. 6C

ORIGINAL WORD THREE - 000110000001010

| TIME | INPUT | REGISTER | BUFFER |
|---|---|---|---|
| 0 | 0 | 000000 | 000000000000000000000 |
| 1 | 0 | 000000 | 000000000000000000000 |
| 2 | 0 | 000000 | 000000000000000000000 |
| 3 | 0 | 000000 | 000000000000000000000 |
| 4 | 1 | 110010 | 100000000000000000000 |
| 5 | 1 | 101011 | 110000000000000000000 |
| 6 | 0 | 100111 | 011000000000000000000 |
| 7 | 0 | 100001 | 001100000000000000000 |
| 8 | 0 | 100010 | 000110000000000000000 |
| 9 | 0 | 010001 | 000011000000000000000 |
| 10 | 0 | 111010 | 000001100000000000000 |
| 11 | 1 | 101111 | 100000110000000000000 |
| 12 | 0 | 100101 | 010000011000000000000 |
| 13 | 1 | 010010 | 101000001100000000000 |
| 14 | 0 | 001001 | 010100000110000000000 |
| 15 | 1 | 000100 | 101010000011000000000 |
| 16 | 0 | 000010 | 010101000001100000000 |
| 17 | 0 | 000001 | 001010100000110000000 |
| 18 | 1 | 000000 | 100101010000011000000 |
| 19 | 0 | 000000 | 010010101000001100000 |
| 20 | 0 | 000000 | 001001010100000110000 |
| 21 | 0 | 000000 | 000100101010000011000 |

WORD THREE ENCODED - 000110000001010100100

INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

Filed Aug. 15, 1966 21 Sheets-Sheet 5

TRANSMITTED WORD ONE - 100010001000100110101
ERROR PATTERN - 000000000000000000000
RECEIVED WORD ONE - 100010001000100110101

| TIME | INPUT | REGISTER | BUFFER | OUTPUT |
|---|---|---|---|---|
| 0 | 0 | 000000 | 000000000000000000000 | |
| 1 | 1 | 110010 | 100000000000000000000 | |
| 2 | 0 | 011001 | 010000000000000000000 | |
| 3 | 0 | 111111 | 001000000000000000000 | |
| 4 | 0 | 011111 | 000100000000000000000 | |
| 5 | 1 | 001111 | 100010000000000000000 | |
| 6 | 0 | 110101 | 010001000000000000000 | |
| 7 | 0 | 101000 | 001000100000000000000 | |
| 8 | 0 | 010100 | 000100010000000000000 | |
| 9 | 1 | 111000 | 100010001000000000000 | |
| 10 | 0 | 011100 | 010001000100000000000 | |
| 11 | 0 | 001110 | 001000100010000000000 | |
| 12 | 0 | 000111 | 000100010001000000000 | |
| 13 | 1 | 000011 | 100010001000100000000 | |
| 14 | 0 | 110011 | 010001000100010000000 | |
| 15 | 0 | 101011 | 001000100010001000000 | |
| 16 | 1 | 010101 | 100100010001000100000 | |
| 17 | 1 | 001010 | 110010001000100010000 | |
| 18 | 0 | 000101 | 011001000100010001000 | |
| 19 | 1 | 000010 | 101100100010001000100 | |
| 20 | 0 | 000001 | 010110010001000100010 | |
| 21 | 1 | 000000 | 101011001000100010001 | |
| NO ERRORS DETECTED | | | | |
| 22 | | 000000 | 010101100100010001000 | 1 |
| 23 | | 000000 | 001010110010001000100 | 0 |
| 24 | | 000000 | 000101011001000100010 | 0 |
| 25 | | 000000 | 000010101100100010001 | 0 |
| 26 | | 000000 | 000001010110010001000 | 1 |
| 27 | | 000000 | 000000101011001000100 | 0 |
| 28 | | 000000 | 000000010101100100010 | 0 |
| 29 | | 000000 | 000000001010110010001 | 0 |
| 30 | | 000000 | 000000000101011001000 | 1 |
| 31 | | 000000 | 000000000010101100100 | 0 |
| 32 | | 000000 | 000000000001010110010 | 0 |
| 33 | | 000000 | 000000000000101011001 | 0 |
| 34 | | 000000 | 000000000000010101100 | 1 |
| 35 | | 000000 | 000000000000001010110 | 0 |
| 36 | | 000000 | 000000000000000101011 | 0 |
| 37 | | 000000 | 000000000000000010101 | 1 |
| 38 | | 000000 | 000000000000000001010 | 1 |
| 39 | | 000000 | 000000000000000000101 | 0 |
| 40 | | 000000 | 000000000000000000010 | 1 |
| 41 | | 000000 | 000000000000000000001 | 0 |
| 42 | | 000000 | 000000000000000000000 | 1 |

Fig. 7A

INVENTORS
NORMAN ABRAMSON
LAWRENCE LUTZKER
BY
Dressler, Goldsmith, Clement & Gordon
ATTORNEYS TRANSMITTED WORD TWO- 110000111001010011001
ERROR PATTERN - 000000000000000000000
RECEIVED WORD TWO - 110000111001010011001

| TIME | INPUT | REGISTER | BUFFER | OUTPUT |
|---|---|---|---|---|
| 0 | 0 | 000000 | 000000000000000000000 | |
| 1 | 1 | 110010 | 100000000000000000000 | |
| 2 | 1 | 101011 | 110000000000000000000 | |
| 3 | 0 | 100111 | 011000000000000000000 | |
| 4 | 0 | 100001 | 001100000000000000000 | |
| 5 | 0 | 100010 | 000110000000000000000 | |
| 6 | 0 | 010001 | 000011000000000000000 | |
| 7 | 1 | 001000 | 100001100000000000000 | |
| 8 | 1 | 110110 | 110000110000000000000 | |
| 9 | 1 | 101001 | 111000011000000000000 | |
| 10 | 0 | 100110 | 011100001100000000000 | |
| 11 | 0 | 010011 | 001110000110000000000 | |
| 12 | 1 | 001001 | 100111000011000000000 | |
| 13 | 0 | 110110 | 010011100001100000000 | |
| 14 | 1 | 101001 | 101001110000110000000 | |
| 15 | 0 | 100110 | 010100111000011000000 | |
| 16 | 0 | 010011 | 001010011100001100000 | |
| 17 | 1 | 001001 | 100101001110000110000 | |
| 18 | 1 | 000100 | 110010100111000011000 | |
| 19 | 0 | 000010 | 011001010011100001100 | |
| 20 | 0 | 000001 | 001100101001110000110 | |
| 21 | 1 | 000000 | 100110010100111000011 | |
| NO ERRORS DETECTED | | | | |
| 22 | | 000000 | 010011001010011100001 | 1 |
| 23 | | 000000 | 001001100101001110000 | 1 |
| 24 | | 000000 | 000100110010100111000 | 0 |
| 25 | | 000000 | 000010011001010011100 | 0 |
| 26 | | 000000 | 000001001100101001110 | 0 |
| 27 | | 000000 | 000000100110010100111 | 0 |
| 28 | | 000000 | 000000010011001010011 | 1 |
| 29 | | 000000 | 000000001001100101001 | 1 |
| 30 | | 000000 | 000000000100110010100 | 1 |
| 31 | | 000000 | 000000000010011001010 | 0 |
| 32 | | 000000 | 000000000001001100101 | 0 |
| 33 | | 000000 | 000000000000100110010 | 1 |
| 34 | | 000000 | 000000000000010011001 | 0 |
| 35 | | 000000 | 000000000000001001100 | 1 |
| 36 | | 000000 | 000000000000000100110 | 0 |
| 37 | | 000000 | 000000000000000010011 | 0 |
| 38 | | 000000 | 000000000000000001001 | 1 |
| 39 | | 000000 | 000000000000000000100 | 1 |
| 40 | | 000000 | 000000000000000000010 | 0 |
| 41 | | 000000 | 000000000000000000001 | 0 |
| 42 | | 000000 | 000000000000000000000 | 1 |

Fig. 7B

INVENTORS.
NORMAN ABRAMSON
LAWRENCE LUTZKER

BY Dressler, Goldsmith, Clement & Gordon
ATTORNEYS

TRANSMITTED WORD THREE- 000110000010101001000
ERROR PATTERN- 000000000000000000000
RECEIVED WORD THREE- 000110000010101001000

| TIME | INPUT | REGISTER | BUFFER | OUTPUT |
|---|---|---|---|---|
| 0 | 0 | 000000 | 000000000000000000000 | |
| 1 | 0 | 000000 | 000000000000000000000 | |
| 2 | 0 | 000000 | 000000000000000000000 | |
| 3 | 0 | 000000 | 000000000000000000000 | |
| 4 | 1 | 110010 | 100000000000000000000 | |
| 5 | 1 | 101011 | 110000000000000000000 | |
| 6 | 0 | 100111 | 011000000000000000000 | |
| 7 | 0 | 100001 | 001100000000000000000 | |
| 8 | 0 | 100010 | 000110000000000000000 | |
| 9 | 0 | 010001 | 000011000000000000000 | |
| 10 | 0 | 111010 | 000001100000000000000 | |
| 11 | 1 | 101111 | 100000110000000000000 | |
| 12 | 0 | 100101 | 010000011000000000000 | |
| 13 | 1 | 010010 | 101000001100000000000 | |
| 14 | 0 | 001001 | 010100000110000000000 | |
| 15 | 1 | 000100 | 101010000011000000000 | |
| 16 | 0 | 000010 | 010101000001100000000 | |
| 17 | 0 | 000001 | 001010100000110000000 | |
| 18 | 1 | 000000 | 100101010000011000000 | |
| 19 | 0 | 000000 | 010010101000001100000 | |
| 20 | 0 | 000000 | 001001010100000110000 | |
| 21 | 0 | 000000 | 000100101010000011000 | |
| NO ERRORS DETECTED | | | | |
| 22 | | 000000 | 000010010101000001100 | |
| 23 | | 000000 | 000001001010100000110 | 0 |
| 24 | | 000000 | 000000100101010000010 | 0 |
| 25 | | 000000 | 000000010010101000011 | 0 |
| 26 | | 000000 | 000000001001010100001 | 1 |
| 27 | | 000000 | 000000000100101010000 | 1 |
| 28 | | 000000 | 000000000010010101000 | 0 |
| 29 | | 000000 | 000000000001001010100 | 0 |
| 30 | | 000000 | 000000000000100101010 | 0 |
| 31 | | 000000 | 000000000000010010101 | 0 |
| 32 | | 000000 | 000000000000001001010 | 0 |
| 33 | | 000000 | 000000000000000100101 | 1 |
| 34 | | 000000 | 000000000000000010010 | 0 |
| 35 | | 000000 | 000000000000000001001 | 1 |
| 36 | | 000000 | 000000000000000000100 | 0 |
| 37 | | 000000 | 000000000000000000010 | 1 |
| 38 | | 000000 | 000000000000000000001 | 0 |
| 39 | | 000000 | 000000000000000000000 | 0 |
| 40 | | 000000 | 000000000000000000000 | 1 |
| 41 | | 000000 | 000000000000000000000 | 0 |
| 42 | | 000000 | 000000000000000000000 | 0 |

Fig. 7C

INVENTORS.
NORMAN ABRAMSON
LAWRENCE LUTZKER
BY Dressler, Goldsmith, Clement & Gordon
ATTORNEYS TRANSMITTED WORD ONE- 1000100010001001110101
ERROR PATTERN - 0000110000000000000000
BECEIVED WORD ONE - 1000010010001001110101

| TIME | INPUT | REGISTER | BUFFER | OUTPUT |
|---|---|---|---|---|
| 0 | 0 | 000000 | 0000000000000000000000 | |
| 1 | 1 | 110010 | 1000000000000000000000 | |
| 2 | 0 | 011001 | 0100000000000000000000 | |
| 3 | 0 | 111110 | 0010000000000000000000 | |
| 4 | 0 | 011111 | 0001000000000000000000 | |
| 5 | 0 | 111101 | 0000100000000000000000 | |
| 6 | 1 | 011110 | 1000010000000000000000 | |
| 7 | 0 | 001111 | 0100001000000000000000 | |
| 8 | 0 | 011010 | 0010000100000000000000 | |
| 9 | 1 | 011010 | 1001000010000000000000 | |
| 10 | 0 | 001101 | 0100100001000000000000 | |
| 11 | 0 | 110100 | 0010010000100000000000 | |
| 12 | 0 | 011010 | 0001001000010000000000 | |
| 13 | 1 | 111111 | 1000100100001000000000 | |
| 14 | 0 | 101101 | 0100010010000100000000 | |
| 15 | 0 | 100100 | 0010001001000010000000 | |
| 16 | 1 | 100000 | 1001000100100001000000 | |
| 17 | 1 | 100010 | 1100100010010000100000 | |
| 18 | 0 | 010001 | 0110010001001000010000 | |
| 19 | 1 | 001000 | 1011001000100100001000 | |
| 20 | 0 | 000100 | 0101100100010010000100 | |
| 21 | 1 | 110000 | 101011001000100100001 | |
| ERROR DETECTED | | | | |
| 22 | | 011000 | 010101100100010010000 | 1 |
| 23 | | 001100 | 001010110010001001000 | 0 |
| 24 | | 000110 | 000101011001000100100 | 0 |
| 25 | | 000011 | 000010101100100010010 | 0 |
| 26 | | 000001 | 000001010110010001001 | 1 |
| 27 | | 000000 | 000000101011001000100 | 0 |
| 28 | | 000000 | 000000010101100100010 | 0 |
| 29 | | 000000 | 000000001010110010001 | 0 |
| 30 | | 000000 | 000000000101011001000 | 1 |
| 31 | | 000000 | 000000000010101100100 | 0 |
| 32 | | 000000 | 000000000001010110010 | 0 |
| 33 | | 000000 | 000000000000101011000 | 0 |
| 34 | | 000000 | 000000000000010101100 | 1 |
| 35 | | 000000 | 000000000000001010110 | 0 |
| 36 | | 000000 | 000000000000000101011 | 0 |
| 37 | | 000000 | 000000000000000010101 | 1 |
| 38 | | 000000 | 000000000000000001010 | 1 |
| 39 | | 000000 | 000000000000000000101 | 0 |
| 40 | | 000000 | 000000000000000000010 | 1 |
| 41 | | 000000 | 000000000000000000001 | 0 |
| 42 | | 000000 | 000000000000000000000 | 1 |

Fig. 8

INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

TRANSMITTED WORD TWO -110000111001010011001
ERROR PATTERN -000000000000000000110
RECEIVED WORD TWO -110000111001010011111

| TIME | INPUT | RECEIVER | BUFFER | OUTPUT |
|---|---|---|---|---|
| 0 | 0 | 000000 | 000000000000000000000 | |
| 1 | 1 | 110010 | 100000000000000000000 | |
| 2 | 1 | 101011 | 110000000000000000000 | |
| 3 | 0 | 100111 | 011000000000000000000 | |
| 4 | 0 | 100001 | 001100000000000000000 | |
| 5 | 0 | 100010 | 000110000000000000000 | |
| 6 | 0 | 010001 | 000011000000000000000 | |
| 7 | 1 | 001000 | 100001100000000000000 | |
| 8 | 1 | 110110 | 110000110000000000000 | |
| 9 | 1 | 101001 | 111000011000000000000 | |
| 10 | 0 | 100110 | 011100001100000000000 | |
| 11 | 0 | 010011 | 001110000110000000000 | |
| 12 | 1 | 001001 | 100111000011000000000 | |
| 13 | 0 | 110110 | 010011100001100000000 | |
| 14 | 1 | 101001 | 101001110000110000000 | |
| 15 | 0 | 100110 | 010100111000011000000 | |
| 16 | 0 | 010011 | 001010011100001100000 | |
| 17 | 1 | 001001 | 100101001110000110000 | |
| 18 | 1 | 000100 | 110010100111000011000 | |
| 19 | 1 | 110000 | 111001010011100001100 | |
| 20 | 1 | 101010 | 111100101001110000110 | |
| 21 | 1 | 100111 | 111110010100111000011 | |
| ERROR DETECTED | | | | |
| 22 | | 100001 | 011111001010011100001 | 1 |
| 23 | | 100010 | 001111100101001110000 | 1 |
| 24 | | 010001 | 000111110010100111000 | 0 |
| 25 | | 111010 | 000011111001010011100 | 0 |
| 26 | | 011101 | 000001111100101001110 | 0 |
| 27 | | 111100 | 000000111110010100111 | 0 |
| 28 | | 011110 | 000000011111001010011 | 1 |
| 29 | | 001111 | 000000001111100101001 | 1 |
| 30 | | 110101 | 000000000111110010100 | 1 |
| 31 | | 101000 | 000000000011111001010 | 0 |
| 32 | | 010100 | 000000000001111100101 | 0 |
| 33 | | 001010 | 000000000000111110010 | 1 |
| 34 | | 000101 | 000000000000011111001 | 0 |
| 35 | | 110000 | 000000000000001111100 | 1 |
| 36 | | 011000 | 000000000000000111110 | 0 |
| 37 | | 001100 | 000000000000000011111 | 0 |
| 38 | | 000110 | 000000000000000001111 | 1 |
| 39 | | 000011 | 000000000000000000111 | 1 |
| 40 | | 000001 | 000000000000000000011 | 0 |
| 41 | | 000000 | 000000000000000000001 | 0 |
| 42 | | 000000 | 000000000000000000000 | 1 |

Fig. 9

INVENTORS
NORMAN ABRAMSON
LAWRENCE LUTZKER
BY
Dressler, Goldsmith, Clement & Gordon
ATTORNEYS TRANSMITTED WORD THREE - 000110000010101001000
ERROR PATTERN - 110000000000000000000
RECEIVED WORD THREE - 110110000010101001000

| TIME | INPUT | RECEIVED | BUFFER | OUTPUT |
|---|---|---|---|---|
| 0 | 0 | 000000 | 000000000000000000000 | |
| 1 | 1 | 110010 | 100000000000000000000 | |
| 2 | 1 | 101011 | 110000000000000000000 | |
| 3 | 0 | 100111 | 011000000000000000000 | |
| 4 | 1 | 010011 | 101100000000000000000 | |
| 5 | 1 | 001001 | 110110000000000000000 | |
| 6 | 0 | 110110 | 011011000000000000000 | |
| 7 | 0 | 011011 | 001101100000000000000 | |
| 8 | 0 | 111111 | 000110110000000000000 | |
| 9 | 0 | 101101 | 000011011000000000000 | |
| 10 | 0 | 100100 | 000001101100000000000 | |
| 11 | 1 | 100000 | 100000110110000000000 | |
| 12 | 0 | 010000 | 010000011011000000000 | |
| 13 | 1 | 111010 | 101000001101100000000 | |
| 14 | 0 | 011101 | 010100000110110000000 | |
| 15 | 1 | 001110 | 101010000011011000000 | |
| 16 | 0 | 000111 | 010101000001101100000 | |
| 17 | 0 | 110001 | 001010100000110110000 | |
| 18 | 1 | 011000 | 100101010000011011000 | |
| 19 | 0 | 001100 | 010010101000001001100 | |
| 20 | 0 | 000110 | 001001010100000110110 | |
| 21 | 0 | 000011 | 000100101010000011011 | |
| ERROR DETECTED | | | | |
| 22 | | 000001 | 000010010101000001101 | 0 |
| 23 | | 000000 | 000001001010100000110 | 0 |
| 24 | | 000000 | 000000100101010000011 | 0 |
| 25 | | 000000 | 000000010010101000001 | 1 |
| 26 | | 000000 | 000000001001010100000 | 1 |
| 27 | | 000000 | 000000000100101010000 | 0 |
| 28 | | 000000 | 000000000010010101000 | 0 |
| 29 | | 000000 | 000000000001001010100 | 0 |
| 30 | | 000000 | 000000000000100101010 | 0 |
| 31 | | 000000 | 000000000000010010101 | 0 |
| 32 | | 000000 | 000000000000001001010 | 1 |
| 33 | | 000000 | 000000000000000100101 | 0 |
| 34 | | 000000 | 000000000000000010010 | 1 |
| 35 | | 000000 | 000000000000000001001 | 0 |
| 36 | | 000000 | 000000000000000000100 | 1 |
| 37 | | 000000 | 000000000000000000010 | 0 |
| 38 | | 000000 | 000000000000000000001 | 0 |
| 39 | | 000000 | 000000000000000000000 | 1 |
| 40 | | 000000 | 000000000000000000000 | 0 |
| 41 | | 000000 | 000000000000000000000 | 0 |
| 42 | | 000000 | 000000000000000000000 | 0 |

Fig. 10

INVENTORS.
NORMAN ABRAMSON
LAWRENCE LUTZKER
BY
Dressler, Goldsmith, Clement & Gordon
ATTORNEYS

ADAPTIVELY CODED DATA COMMUNICATIONS SYSTEM

Filed Aug. 15, 1966 21 Sheets-Sheet 11

TRANSMITTED WORD TWO - 110000111001010011001
ERROR PATTERN - 000000000000000000111
RECEIVED WORD TWO - 110000111001010011110

| TIME | INPUT | REGISTER | BUFFER |
|---|---|---|---|
| 0 | 0 | 000000 | 000000000000000000000 |
| 1 | 1 | 110010 | 100000000000000000000 |
| 2 | 1 | 101011 | 110000000000000000000 |
| 3 | 0 | 100111 | 011000000000000000000 |
| 4 | 0 | 100001 | 001100000000000000000 |
| 5 | 0 | 100010 | 000110000000000000000 |
| 6 | 0 | 010001 | 000011000000000000000 |
| 7 | 1 | 001000 | 100001100000000000000 |
| 8 | 1 | 110110 | 110000110000000000000 |
| 9 | 1 | 101001 | 111000011000000000000 |
| 10 | 0 | 100110 | 011100001100000000000 |
| 11 | 0 | 010011 | 001110000110000000000 |
| 12 | 1 | 001001 | 100111000011000000000 |
| 13 | 0 | 110110 | 010011100001100000000 |
| 14 | 1 | 101001 | 101001110000110000000 |
| 15 | 0 | 100110 | 000100111000011000000 |
| 16 | 0 | 010011 | 000010011100001100000 |
| 17 | 1 | 001001 | 100001001110000110000 |
| 18 | 1 | 000100 | 110000100111000011000 |
| 19 | 1 | 110000 | 111000010011100001100 |
| 20 | 1 | 101010 | 111100001001110000110 |
| 21 | 0 | 010101 | 011110000100111000011 |
| ERROR DETECTED | | | |
| 22 | | 111000 | 001111000010011100001 |
| 23 | | 011100 | 000111100001001110000 |
| 24 | | 001110 | 000011110000100111000 |
| 25 | | 000111 | 000001111000010011100 |
| 26 | | 110001 | 000000111100001001110 |
| 27 | | 101010 | 000000011110000100111 |
| 28 | | 010101 | 000000001111000010011 |
| 29 | | 111000 | 000000000111100001001 |
| 30 | | 011100 | 000000000011110000100 |
| 31 | | 001110 | 000000000001111000010 |
| 32 | | 000111 | 000000000000111100001 |
| 33 | | 110001 | 000000000000011110000 |
| 34 | | 101010 | 000000000000001111000 |
| 35 | | 010101 | 000000000000000111100 |
| 36 | | 111000 | 000000000000000011110 |
| 37 | | 011100 | 000000000000000001111 |
| 38 | | 001110 | 000000000000000000111 |
| 39 | | 000111 | 000000000000000000011 |
| 40 | | 110001 | 000000000000000000001 |
| 41 | | 101010 | 000000000000000000000 |
| 42 | | 010101 | 000000000000000000000 |
| UNCORRECTABLE ERROR | | | |

Fig. 11

INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

TRANSMITTED WORD THREE-000110000010101001000
ERROR PATTERN -111000000000000000000
RECEIVED WORD THREE -111110000010101001000

| TIME | INPUT | REGISTER | BUFFER |
|---|---|---|---|
| 0 | 0 | 000000 | 000000000000000000000 |
| 1 | 1 | 110010 | 100000000000000000000 |
| 2 | 1 | 101011 | 110000000000000000000 |
| 3 | 1 | 010101 | 111000000000000000000 |
| 4 | 1 | 001010 | 111100000000000000000 |
| 5 | 1 | 110111 | 111110000000000000000 |
| 6 | 0 | 101001 | 011111000000000000000 |
| 7 | 0 | 100110 | 001111100000000000000 |
| 8 | 0 | 010011 | 000111110000000000000 |
| 9 | 0 | 111011 | 000011111000000000000 |
| 10 | 0 | 101111 | 000001111100000000000 |
| 11 | 1 | 010111 | 100000111110000000000 |
| 12 | 0 | 111001 | 010000011111000000000 |
| 13 | 1 | 011100 | 101000001111100000000 |
| 14 | 0 | 001110 | 010100000111110000000 |
| 15 | 1 | 110101 | 101010000011111000000 |
| 16 | 0 | 101000 | 010101000001111100000 |
| 17 | 0 | 010100 | 001010100000111110000 |
| 18 | 1 | 111000 | 100101010000011111000 |
| 19 | 0 | 011100 | 010010101000001111100 |
| 20 | 0 | 001110 | 001001010100000111110 |
| 21 | 0 | 000111 | 000100101010000011111 |
| ERROR DETECTED | | | |
| 22 | | 110001 | 000010010101000001111 |
| 23 | | 101010 | 000001001010100000111 |
| 24 | | 010101 | 000000100101010000011 |
| 25 | | 111000 | 000000010010101000001 |
| 26 | | 011100 | 000000001001010100000 |
| 27 | | 001110 | 000000000100101010000 |
| 28 | | 000111 | 000000000010010101000 |
| 29 | | 110001 | 000000000001001010100 |
| 30 | | 101010 | 000000000000100101010 |
| 31 | | 010101 | 000000000000010010101 |
| 32 | | 111000 | 000000000000001001010 |
| 33 | | 011100 | 000000000000000100101 |
| 34 | | 001110 | 000000000000000010010 |
| 35 | | 000111 | 000000000000000001001 |
| 36 | | 110001 | 000000000000000000100 |
| 37 | | 101010 | 000000000000000000010 |
| 38 | | 010101 | 000000000000000000001 |
| 39 | | 111000 | 000000000000000000000 |
| 40 | | 011100 | 000000000000000000000 |
| 41 | | 001110 | 000000000000000000000 |
| 42 | | 000111 | 000000000000000000000 |
| UCORRECTABLE ERROR | | | |

Fig. 12

INVENTORS
NORMAN ABRAMSON
LAWRENCE LUTZKER
BY Dressler, Goldsmith, Clement & Gordon
ATTORNEYS WORDS 1 & 2 & 3 (a=3)

1 - 1
2 - 0
3 - 0
4 - 0
5 - 1
6 - 0
7 - 0
8 - 0
9 - 1
10 - 0
11 - 0
12 - 0
13 - 1
14 - 0
15 - 0
16 - 1
17 - 1
18 - 0
19 - 0
20 - 0
21 - 0
22 - 1
23 - 1
24 - 1
25 - 0
26 - 0
27 - 1
28 - 0
29 - 1
30 - 0
31 - 0
32 - 0
33 - 0
34 - 1
35 - 1
36 - 0
37 - 0
38 - 0
39 - 0
40 - 0
41 - 1
42 - 0
43 - 1
44 - 0
45 - 1
46 - 0
47 - 1
48 - 0
49 - 0
50 - 1
51 - 0
52 - 1
53 - 1
54 - 1
55 - 1
56 - 0
57 - 0
58 - 0
59 - 0
60 - 1
61 - 0
62 - 1
63 - 0

INVENTORS.
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

Filed Aug. 15, 1966 21 Sheets-Sheet 14

INVENTORS
NORMAN ABRAMSON
BY LAWRENCE LUTZKER
Dressler, Goldsmith, Clement & Gordon
ATTORNEYS

ADAPTIVELY CODED DATA COMMUNICATIONS SYSTEM

Filed Aug. 15, 1966 21 Sheets-Sheet 15

TRANSMITTED WORD - 1000100010001001100001110010100001100000101010100101111100001010
ERROR PATTERN - 0000000000000000000000000000000000000000000000000000000000000000
RECORDED WORD - 1000100010001001100001110010100001100000101010100101111100001010

| TIME | REGISTER | INPUT | BUFFER | OUTPUT |
|---|---|---|---|---|
| 0 | 0000000000000000000 | 0 | 0000000000000000000000000000000000000000000000000000000000000000 | |
| 1 | 1000000000000000000 | 1 | 1000000000000000000000000000000000000000000000000000000000000000 | |
| 2 | 0100100000000010000 | 0 | 0100000000000000000000000000000000000000000000000000000000000000 | |
| 3 | 0010010000000001000 | 0 | 0010000000000000000000000000000000000000000000000000000000000000 | |
| 4 | 0001001000000000100 | 0 | 0001000000000000000000000000000000000000000000000000000000000000 | |
| 5 | 1001100100000100010 | 1 | 1000100000000000000000000000000000000000000000000000000000000000 | |
| 6 | 0100110010000010001 | 0 | 0100010000000000000000000000000000000000000000000000000000000000 | |
| 7 | 101101100100101000 | 0 | 0010001000000000000000000000000000000000000000000000000000000000 | |
| 8 | 010110110010010100 | 0 | 0001000100000000000000000000000000000000000000000000000000000000 | |
| 9 | 101111011001101010 | 1 | 1000100010000000000000000000000000000000000000000000000000000000 | |
| 10 | 010111101100100101 | 0 | 0100010001000000000000000000000000000000000000000000000000000000 | |
| 11 | 101111110110111010 | 0 | 0010001000100000000000000000000000000000000000000000000000000000 | |
| 12 | 010111111011011101 | 0 | 0001000100010000000000000000000000000000000000000000000000000000 | |
| 13 | 001011111101101110 | 1 | 1000100010001000000000000000000000000000000000000000000000000000 | |
| 14 | 000101111110110111 | 0 | 0100010001000100000000000000000000000000000000000000000000000000 | |
| 15 | 100110111111111011 | 0 | 0010001000100010000000000000000000000000000000000000000000000000 | |
| 16 | 010011011111111101 | 1 | 1001000100010001000000000000000000000000000000000000000000000000 | |
| 17 | 001001101111111110 | 1 | 1000100010001000100000000000000000000000000000000000000000000000 | |
| 18 | 000100110111111111 | 0 | 0100010001000100010000000000000000000000000000000000000000000000 | |
| 19 | 100110011011011111 | 0 | 0010001000100010001000000000000000000000000000000000000000000000 | |
| 20 | 110111001101001111 | 0 | 0001000100010001000100000000000000000000000000000000000000000000 | |
| 21 | 111111100110000111 | 0 | 0000100010001000100010000000000000000000000000000000000000000000 | |
| 22 | 011111110011000011 | 1 | 1000010001000100010001000000000000000000000000000000000000000000 | |
| 23 | 001111111001100001 | 1 | 1100001000100010001000100000000000000000000000000000000000000000 | |
| 24 | 000111111100110000 | 1 | 1010000100010001000100010000000000000000000000000000000000000000 | |
| 25 | 000011111110011000 | 0 | 0101000010001000100010001000000000000000000000000000000000000000 | |
| 26 | 000001111111001100 | 0 | 0010100001000100010001000100000000000000000000000000000000000000 | |
| 27 | 100100111111000110 | 1 | 1001010000100010001000100010000000000000000000000000000000000000 | |
| 28 | 010010011111100011 | 0 | 0100101000010001000100010001000000000000000000000000000000000000 | |
| 29 | 001001001111110001 | 1 | 1010010100001000100010001000100000000000000000000000000000000000 | |
| 30 | 100000100111011000 | 0 | 0101001010000100010001000100010000000000000000000000000000000000 | |
| 31 | 010000010011101100 | 0 | 0010100101000010001000100010001000000000000000000000000000000000 | |
| 32 | 001000001001110110 | 0 | 0001010010100001000100010001000100000000000000000000000000000000 | |
| 33 | 000100000100111011 | 0 | 0000101001010000100010001000100010000000000000000000000000000000 | |
| 34 | 000010000010011101 | 1 | 1000010100101000010001000100010001000000000000000000000000000000 | |
| 35 | 000001000001001110 | 1 | 1100001010010100001000100010001000100000000000000000000000000000 | |
| 36 | 000000100000100111 | 0 | 0110000101001010000100010001000100010000000000000000000000000000 | |
| 37 | 100100010000110011 | 0 | 0110000010100101000010001000100010001000000000000000000000000000 | |
| 38 | 110110001000111001 | 0 | 0011000001010010100001000100010001000100000000000000000000000000 | |

Fig. 17A

INVENTORS
NORMAN ABRAMSON
LAWRENCE LUTZKER

BY Dressler, Goldsmith, Clement & Gordon

ATTORNEYS

ADAPTIVELY CODED DATA COMMUNICATIONS SYSTEM

Filed Aug. 15, 1966 21 Sheets-Sheet 16

| | | | | |
|---|---|---|---|---|
| 39 | 111111000100111100 | 0 | 000011000010100111000011001000100010001000000000000000000000000 | |
| 40 | 011111100010011110 | 0 | 000001100001010011100001100100010001000100000000000000000000000 | |
| 41 | 101011110001101111 | 1 | 100000110000101001110000110010001000100010000000000000000000000 | |
| 42 | 110001111000010111 | 0 | 010000011000010100111000011001000100010001000000000000000000000 | |
| 43 | 011000111100001011 | 1 | 101000001100001010011100001100100010001000100000000000000000000 | |
| 44 | 101000011110100101 | 0 | 010100000110000101001110000110010001000100010000000000000000000 | |
| 45 | 010100001111010010 | 1 | 101010000011000010100111000011001000100010001000000000000000000 | |
| 46 | 001010000111101001 | 0 | 010101000001100001010011100001100100010001000100000000000000000 | |
| 47 | 000101000011110100 | 1 | 101010100000110000101001110000110010001000100010000000000000000 | |
| 48 | 000010100001111010 | 0 | 010101010000011000010100111000011001000100010001000000000000000 | |
| 49 | 000001010000111101 | 0 | 001010101000001100001010011100001100100010001000100000000000000 | |
| 50 | 000000101000011110 | 1 | 100101010100000110000101001110000110010001000100010000000000000 | |
| 51 | 000000010100001111 | 0 | 010010101010000011000010100111000011001000100010001000000000000 | |
| 52 | 000000001010000111 | 1 | 101001010101000001100001010011100001100100010001000100000000000 | |
| 53 | 000000000101000011 | 1 | 110100101010100000110000101001110000110010001000100010000000000 | |
| 54 | 000000000010100001 | 1 | 111010010101010000011000010100111000011001000100010001000000000 | |
| 55 | 000000000001010000 | 1 | 111101001010101000001100001010011100001100100010001000100000000 | |
| 56 | 000000000000101000 | 0 | 011110100101010100000110000101001110000110010001000100010000000 | |
| 57 | 000000000000010100 | 0 | 001111010010101010000011000010100111000011001000100010001000000 | |
| 58 | 000000000000001010 | 0 | 000111101001010101000001100001010011100001100100010001000100000 | |
| 59 | 000000000000000101 | 0 | 000011110100101010100000110000101001110000110010001000100010000 | |
| 60 | 000000000000000010 | 1 | 100001111010010101010000011000010100111000011001000100010001000 | |
| 61 | 000000000000000001 | 0 | 010000111101001010101000001100001010011100001100100010001000100 | |
| 62 | 000000000000000000 | 1 | 101000011110100101010100000110000101001110000110010001000100010 | |
| 63 | 000000000000000000 | 0 | 010100001111010010101010000011000010100111000011001000100010001 | |
| NO ERROR DETECTED | | | | |
| 64 | 000000000000000000 | | 001010000111101001010101000001100001010011100001100100010001000 | 1 |
| 65 | 000000000000000000 | | 000101000011110100101010100000110000101001110000110010001000100 | 0 |
| 66 | 000000000000000000 | | 000010100001111010010101010000011000010100111000011001000100010 | 0 |
| 67 | 000000000000000000 | | 000001010000111101001010101000001100001010011100001100100010001 | 0 |
| 68 | 000000000000000000 | | 000000101000011110100101010100000110000101001110000110010001000 | 1 |
| 69 | 000000000000000000 | | 000000010100001111010010101010000011000010100111000011001000100 | 0 |
| 70 | 000000000000000000 | | 000000001010000111101001010101000001100001010011100001100100010 | 0 |
| 71 | 000000000000000000 | | 000000000101000011110100101010100000110000101001110000110010001 | 0 |
| 72 | 000000000000000000 | | 000000000010100001111010010101010000011000010100111000011001000 | 1 |
| 73 | 000000000000000000 | | 000000000001010000111100001010101000001100001010011100001100100 | 0 |
| 74 | 000000000000000000 | | 000000000000101000011110000101010100000110000101001110000110010 | 0 |
| 75 | 000000000000000000 | | 000000000000010100001111000010101010000011000010100111000011001 | 0 |
| 76 | 000000000000000000 | | 000000000000001010000111100001010101000001100001010011100001100 | 1 |
| 77 | 000000000000000000 | | 000000000000000101000011110000101010100000110000101001110000110 | 0 |
| 78 | 000000000000000000 | | 000000000000000010100001111000010101010000011000010100111000011 | 0 |
| 79 | 000000000000000000 | | 000000000000000001010000111100001010101000001100001010011100001 | 1 |
| 80 | 000000000000000000 | | 000000000000000000101000011110000101010100000110000101001110000 | 1 |
| 81 | 000000000000000000 | | 000000000000000000010100001111000010101010000011000010100111000 | 0 |
| 82 | 000000000000000000 | | 000000000000000000001010000111101001010101000001100001010011100 | 0 |

Fig. 17B

INVENTORS
NORMAN ABRAMSON
LAWRENCE LUTZKER
BY Dressler, Goldsmith, Clement & Gordon
ATTORNEYS INVENTORS
NORMAN ABRAMSON
LAWRENCE LUTZKER
BY Dressler, Goldsmith, Clement & Gordon
ATTORNEYS

ADAPTIVELY CODED DATA COMMUNICATIONS SYSTEM

Filed Aug. 15, 1966 21 Sheets-Sheet 18

Fig. 18A

TRANSMITTED WORD - 100010001000100110000111001010000110000010101010010111100001010
ERROR PATTERN - 000000000000000000000000000000000000000111110000000000000000000
RECORDED WORD - 100010001000100110000111001010000110000101010010010111100001010

| TIME | INPUT | REGISTER | BUFFER | OUTPUT |
|---|---|---|---|---|
| 0 | 0 | 000000000000000000 | 000000000000000000000000000000000000000000000000000000000000000 | |
| 1 | 1 | 100100000000100000 | 100000000000000000000000000000000000000000000000000000000000000 | |
| 2 | 0 | 010010000000010000 | 010000000000000000000000000000000000000000000000000000000000000 | |
| 3 | 0 | 001001000000001000 | 001000000000000000000000000000000000000000000000000000000000000 | |
| 4 | 0 | 000100100000000100 | 000100000000000000000000000000000000000000000000000000000000000 | |
| 5 | 1 | 100110010000000010 | 100010000000000000000000000000000000000000000000000000000000000 | |
| 6 | 0 | 010011001000000001 | 010001000000000000000000000000000000000000000000000000000000000 | |
| 7 | 0 | 101101100100101000 | 001000100000000000000000000000000000000000000000000000000000000 | |
| 8 | 0 | 010110110010010100 | 000100010000000000000000000000000000000000000000000000000000000 | |
| 9 | 1 | 101111011001101010 | 100010001000000000000000000000000000000000000000000000000000000 | |
| 10 | 0 | 010111101100110101 | 010001000100000000000000000000000000000000000000000000000000000 | |
| 11 | 0 | 101111111011011010 | 001000100010000000000000000000000000000000000000000000000000000 | |
| 12 | 0 | 010111111101101101 | 000100010001000000000000000000000000000000000000000000000000000 | |
| 13 | 1 | 001011111110110110 | 100010001000100000000000000000000000000000000000000000000000000 | |
| 14 | 0 | 000101111111011011 | 010001000100010000000000000000000000000000000000000000000000000 | |
| 15 | 0 | 100110111111111011 | 001000100010001000000000000000000000000000000000000000000000000 | |
| 16 | 1 | 010011011111111101 | 100100010001000100000000000000000000000000000000000000000000000 | |
| 17 | 1 | 001001101111111110 | 110010001000100010000000000000000000000000000000000000000000000 | |
| 18 | 0 | 000100110111111111 | 011001000100010001000000000000000000000000000000000000000000000 | |
| 19 | 0 | 100110011011011111 | 001100100010001000100000000000000000000000000000000000000000000 | |
| 20 | 0 | 110111001101001111 | 000110010001000100010000000000000000000000000000000000000000000 | |
| 21 | 0 | 111111100110000111 | 000011001000100010001000000000000000000000000000000000000000000 | |
| 22 | 1 | 011111110011000011 | 100001100100010001000100000000000000000000000000000000000000000 | |
| 23 | 1 | 001111111001100001 | 110000110010001000100010000000000000000000000000000000000000000 | |
| 24 | 1 | 000111111100110000 | 111000011001000100010001000000000000000000000000000000000000000 | |
| 25 | 0 | 000011111110011000 | 011100001100100010001000100000000000000000000000000000000000000 | |
| 26 | 0 | 000001111111001100 | 001110000110010001000100010000000000000000000000000000000000000 | |
| 27 | 1 | 100100111111000110 | 100111000011001000100010001000000000000000000000000000000000000 | |
| 28 | 0 | 010010011111100011 | 010011100001100100010001000100000000000000000000000000000000000 | |
| 29 | 1 | 001001001111110001 | 101001110000110010001000100010000000000000000000000000000000000 | |
| 30 | 0 | 100000100111011000 | 010100111000011001000100010001000000000000000000000000000000000 | |
| 31 | 0 | 010000010011101100 | 001010011100001100100010001000100000000000000000000000000000000 | |
| 32 | 0 | 001000001001110110 | 000101001110000110010001000100010000000000000000000000000000000 | |
| 33 | 0 | 000100000100111011 | 000010100111000011001000100010001000000000000000000000000000000 | |
| 34 | 1 | 000010000010011101 | 100001010011100001100100010001000100000000000000000000000000000 | |
| 35 | 1 | 000001000001001110 | 110000101001110000110010001000100010000000000000000000000000000 | |
| 36 | 0 | 000000100000100111 | 011000010100111000011001000100010001000000000000000000000000000 | |
| 37 | 0 | 100100010000110011 | 001100001010011100001100100010001000100000000000000000000000000 | |

INVENTORS
NORMAN ABRAMSON
LAWRENCE LUTZKER

BY Dressler, Goldsmith, Clement & Gordon
ATTORNEYS

INVENTORS
NORMAN ABRAMSON
LAWRENCE LUTZKER

BY Dressler, Goldsmith, Clement & Gordon
ATTORNEYS

ADAPTIVELY CODED DATA COMMUNICATIONS SYSTEM

| | | | | |
|---|---|---|---|---|
| 82 | | 000011100011100000 | 000000000000000000001010000111101001001010100001100001010011100 | 0 |
| 83 | | 000001110001110000 | 000000000000000000000101000011110100100101010000110000101001110 | 0 |
| 84 | | 000000111000111000 | 000000000000000000000010100001111010010010101000011000010100111 | 0 |
| 85 | | 000000011100011100 | 000000000000000000000001010000111101001001010100001100001010011 | 1 |
| 86 | | 000000001110001110 | 000000000000000000000000101000011110100100101010000110000101001 | 1 |
| 87 | | 000000000111000111 | 000000000000000000000000010100001111010010010101000011000010100 | 1 |
| 88 | | 100100000001100011 | 000000000000000000000000001010000111101001001010100001100001010 | 0 |
| 89 | | 110110000000100001 | 000000000000000000000000000101000011110100100101010000110000101 | 0 |
| 90 | | 111111000000000000 | 000000000000000000000000000010100001111010010010101000011000010 | 1 |
| 91 | | 011111100000000000 | 000000000000000000000000000001010000111101001001010100001100001 | 0 |
| 92 | | 001111110000000000 | 000000000000000000000000000000101000011110100100101010000110000 | 1 |
| 93 | | 000111111000000000 | 000000000000000000000000000000010100001111010010010101000011000 | 0 |
| 94 | | 000011111100000000 | 000000000000000000000000000000001010000111101001001010100001100 | 0 |
| 95 | | 000001111110000000 | 000000000000000000000000000000000101000011110100100101010000110 | 0 |
| 96 | | 000000111111000000 | 000000000000000000000000000000000010100001111010010010101000011 | 0 |
| 97 | | 000000011111100000 | 000000000000000000000000000000000001010000111101001001010100001 | 1 |
| 98 | | 000000001111110000 | 000000000000000000000000000000000000101000011110100100101010000 | 1 |
| 99 | | 000000000111111000 | 000000000000000000000000000000000000010100001111010010010101000 | 0 |
| 100 | | 000000000011111100 | 000000000000000000000000000000000000001010000111101001001010100 | 0 |
| 101 | | 000000000001111110 | 000000000000000000000000000000000000000101000011110100100101010 | 0 |
| 102 | | 000000000000111111 | 000000000000000000000000000000000000000010100001111010010010101 | 0 |
| 103 | | 000000000000011111 | 000000000000000000000000000000000000000001010000111101001001010 | 0 |
| 104 | | 000000000000001111 | 000000000000000000000000000000000000000000101000011110100100101 | 1 |
| 105 | | 000000000000000111 | 000000000000000000000000000000000000000000010100001111010010010 | 0 |
| 106 | | 000000000000000011 | 000000000000000000000000000000000000000000001010000111101001001 | 1 |
| 107 | | 000000000000000001 | 000000000000000000000000000000000000000000000101000011110100100 | 0 |
| 108 | | 000000000000000000 | 000000000000000000000000000000000000000000000010100001111010010 | 1 |
| 109 | | 000000000000000000 | 000000000000000000000000000000000000000000000001010000111101001 | 0 |
| 110 | | 000000000000000000 | 000000000000000000000000000000000000000000000000101000011110100 | 1 |
| 111 | | 000000000000000000 | 000000000000000000000000000000000000000000000000010100001111010 | 0 |
| 112 | | 000000000000000000 | 000000000000000000000000000000000000000000000000001010000111101 | 0 |
| 113 | | 000000000000000000 | 000000000000000000000000000000000000000000000000000101000011110 | 1 |
| 114 | | 000000000000000000 | 000000000000000000000000000000000000000000000000000010100001111 | 0 |
| 115 | | 000000000000000000 | 000000000000000000000000000000000000000000000000000001010000111 | 1 |
| 116 | | 000000000000000000 | 000000000000000000000000000000000000000000000000000000101000011 | 1 |
| 117 | | 000000000000000000 | 000000000000000000000000000000000000000000000000000000010100001 | 1 |
| 118 | | 000000000000000000 | 000000000000000000000000000000000000000000000000000000001010000 | 1 |
| 119 | | 000000000000000000 | 000000000000000000000000000000000000000000000000000000000101000 | 0 |
| 120 | | 000000000000000000 | 000000000000000000000000000000000000000000000000000000000010100 | 0 |
| 121 | | 000000000000000000 | 000000000000000000000000000000000000000000000000000000000001010 | 0 |
| 122 | | 000000000000000000 | 000000000000000000000000000000000000000000000000000000000000101 | 0 |
| 123 | | 000000000000000000 | 000000000000000000000000000000000000000000000000000000000000010 | 1 |
| 124 | | 000000000000000000 | 000000000000000000000000000000000000000000000000000000000000001 | 0 |
| 125 | | 000000000000000000 | 000000000000000000000000000000000000000000000000000000000000000 | 1 |
| 126 | | 000000000000000000 | 000000000000000000000000000000000000000000000000000000000000000 | 0 |

Fig. 18C

INVENTORS
NORMAN ABRAMSON
LAWRENCE LUTZKER

BY Dressler, Goldsmith, Clement & Gordon
ATTORNEYS

INVENTORS.
NORMAN ABRAMSON
LAWRENCE LUTZKER
BY Dressler, Goldsmith, Clement & Gordon
ATTORNEYS 3,506,961
ADAPTIVELY CODED DATA COMMUNICATIONS SYSTEM Norman Abramson, Arlington, Va., and Lawrence Lutzker, Palo Alto, Calif., assignors to American Computer Communications Co., Inc., a corporation of Delaware Filed Aug. 15, 1966, Ser. No. 572,467
Int. Cl. G06f *11/00*
U.S. Cl. 340—146.1 10 Claims

ABSTRACT OF THE DISCLOSURE

An adaptively coded communications system in which the efficiency of data transmission is maintained under varying noise conditions by increasing the error correction capabilities in the system without changing codes and without increasing the percentage redundancy of the transmitted data. The potency of the system is effected by adaptively increasing the block length of the data transmitted and by using the longer block length to generate desired check bits as a function thereof which check bits are interleaved throughout the entire block length of the transmitted data.

The application relates to digital data processing and communications systems and more particularly to digital data communications systems having a capability of adaptively detecting, locating and correcting errors occurring in digital information communicated from one point to another.

In pulse coded or digital processing and communications systems, the intelligence to be communicated or processed takes the form of discrete energy values; information is described by combinations of discrete digital representations. Typically, these representations are binary in character, although other digital forms may, of course, be used to represent such intelligence. In binary systems, information is usually represented either by coded arrangement of the presence or absence of pulses or by a coded arrangement of positive or negative pulses, indicated, respectively, as "1's" or "0's."

The value of a digital system is a direct function of its ability to accurately process or communicate information in digital form, i.e., a function of the system's ability to maintain the integrity of this information. In order to do this, part of the transmitted or processed message is reserved for redundant data bits utilized to check the integrity of the information data bit portion of the message. It is important to be able to utilize the redundant portion of the message to eliminate or at least detect errors occurring in the information portion of the message. The importance of error detection and correction arises from the fact that it is not easy and sometimes not even possible to determine what a particular bit should be in relation to the rest of the data by extrapolating from the overall content of the message, a process used in visual graphic communications.

Certain classes of systems in which each bit of data may be operated on at any given time in order to accomplish a given result and in which the form of the data is continually changing of necessity are able to check the accuracy of each bit continuously or at any given time. Error detecting apparatus which are used for such systems operate on an independent, bit-by-bit basis.

Block data processing and transmission systems function on a different principle than do bit-by-bit data processing and transmission systems. For example, in data transmission, the purpose is to receive the same identical information that was transmitted. It is possible, therefore, to utilize long block lengths of information, not feasible in bit-by-bit operations, to provide greater reliability and efficiency in the transmission of information.

The present state of the art may be considered satisfactory insofar as it is used to detect the presence or occurrence of errors in messages. Such systems are, however, inadequate when required to correct errors or even to locate them within a particular portion of a message. Most systems are dependent upon retransmission of the message in order to obtain correct communication, while systems which do try to correct received messages are complex and expensive.

One reason behind the unsatisfactory approach to error correction is the philosophy upon which most techniques for error correction are based—the assumption that errors occur in a random pattern. This philosophy is a direct descendant of the bit-by-bit procedures utilized in some data processing systems as indicated above. The reason that general attempts to correct errors on this basis are not successful is that such error correction requires an inordinately high number of calculations in order for any error correction system to have an actual capability of correcting random errors that may occur.

Another method which is used in attempting to correct randomly occurring errors is the comparison of the received message with a message locally stored at the decoder in a "code book." This technique, of course, is limited since only these messages stored in the "code book" may be utilized. Any attempt to use this system for all messages would necessitate the use of a gigantic "code book" memory.

Other systems, such as majority testing of redundant algebraic relationship among the digits of the received messages in an attempt to recreate the digit sequence of the original message, may also be used. This particular approach is deficient for the afore-mentioned reasons since it also requires large numbers of calculations in order to adequately perform error correction. Still other parity checking techniques have also been attempted, but the amount of redundant information required in such systems in order to perform any meaningful error correction makes their availability and practicality somewhat limited. The question of the amount of redundant information, or the amount of calculations, is important not only in the terms of hardware, but it is also important in the terms of efficiency of the system. The ability to provide error-free reception cannot be considered theoretically in a vacuum. The economics of apparatus and time are integral factors of any successful system. The throughput or efficiency of an effective system must be such as to warrant investment in the apparatus required to implement it.

Throughput may be defined as the relationship of the amount of information accurately communicated, to the theoretical capacity of a system to communicate information in an ideal environment. Another way of stating this throughput capacity of a system is to define it in terms of the actual time required to communicate information as compared to the theoretical time it would take to communicate a similar amount of information under ideal conditions.

One factor which tends to reduce the throughput capacity of any system is, of course, the addition of redundant data to the message. As explained above, error correcting or detecting systems require some redundant data. However, the more redundant data required to perform any given operation, the less efficient the system. If, in order to perfor error correction, too high a redundant data content is required, the system loses its value.

Other factors which reduce throughput of a system include the additional time required to restransmit a message that has been communicated incorrectly; the utilization of duplex transmission or redundant channels to reduce the amount of retransmission; and the amount of time the system is shutdown completely because the communication channels become so noisy as to make it impossible to accurately communicate. Shut down time becomes particularly important when some systems have the capability of operating under noise conditions which incapacitate other systems since this capability improves the relative throughput capacities of the more efficient systems.

Not only can data communication systems utilize a concept of error detection and correction different from bit-by-bit systems because of the nature of the information, but the nature of the errors that occur in communication channels is also of a different character. As a practical matter, errors in communication systems do not appear to occur primarily in a random pattern. Rather, they occur in sudden bursts lasting various, continuous periods of time. For example, impulses picked up in a transmission channel, surges in power sources, noise characteristics of the hardware itself, atmospheric fading and other occurring noise patterns generally cause errors to occur over variable length bursts of successive digits. Such errors manifest themselves by affecting the pattern of digital pulses in the message. Thus, depending upon the specific type of digital system used, the polarity of a plurality of adjacent pulses may be erroneously reversed, or pulses may be effectively added to or substracted from the signal.

The present invention is designed to cope with the occurrence of such burst errors of various durations. It is based on a suitable code arrangement which is designed to cope with burst errors, typically, one in which the redundant bits are not generated completely from adjacent information bits. Such a code, in effect, distributes the redundant information throughout the entire message. This distribution operates to prevent a burst of errors from destroying information bits and redundant bits completely dependent upon each other thereby frustrating any error-correction capabilities. In this way, burst error correcting codes can correct errors which occur when a burst of noise mutilates a series of successive bits in a message.

Particularly when compared with devices for detection of randomly occurring errors, burst error correcting encoders and decoders are relatively easy to construct, are efficient, not only in their operation, but in the percentage redundancy required to accomplish meaningful error correction, and are effective in the results produced. For example, if it were desired to design a system capable of correcting 100 errors occurring randomly in a block of information having a length of $10^4$ bits, a code with 10 percent redundancy, in other words 1,000 redundant bits, would be used to perform the aproximately $10^6$ calculations in order to correct these errors. On the other hand, a burst error correcting code capable of correcting a burst error of 100 digits in a block of information $10^4$ digits long need utilize only 113 redundant digits, a 1.13 percent redundancy.

The theoretical capacity and power of such burst error correcting codes and their relationship to random correcting codes is explained, for example, in Error Correcting Codes, by W. Wesley Peterson, published by the M.I.T. Press, 1961. Even in this recent publication, the potency of such codes, as effective as they are, has not been fully appreciated. For example, it is indicated therein that it is possible to increase the error correcting capabilities of such codes by increasing the percentage of redundancy, i.e., by changing the particular code used.

By the present invention, means are provided to utilize the additional available potential of such burst error correcting codes. Such increase in code potency can be effected *without* increasing the percentage redundancy. In other words, it is possible to expand the capabilities of a digital system and improve its potency without altering the code being used and without substituting a new, less efficient code.

This is accomplished by adaptively increasing the block length of information utilized as the basis for generating the redundant bits to provide greater reliability by interleaving the redundant bits over increasingly longer block lengths of information.

For example, in a code defined by the generator polynominal $g(x)=(x^3+x+1)(x^3+1)$ the basic block length of the message would be 21 bits. Of these 21 bits, there would be 15 information bits and 6 redundant bits. This code would have a theoretical capability of correcting error bursts of 2 bits in length or less, and a capability of detecting errors greater than bursts of 2-bit duration.

One adaptive code that can be utilized in accordance with the present invention may be defined by a generator polynominal of $g_a(x)=p(x^a)(x^{ac}+1)=g(x^a)$ where $a$ is the adaptive parameter of the present invention adjusted in accordance with the noise condition of the communication channel. The effect of the parameter $a$ is to interlace strings of check digits over longer blocks of information to effectively impose a code with generator $g(x)$ on every $a$th digit in a block. Thus, if an error burst of length less than a $$\left(\frac{c+1}{2}\right)$$

occurs, the code effectively distributes these errors $$\left(\frac{c+1}{2}\right)$$

to a sub-block, which is equivalent to the occurrence of a number of such errors in separate coding blocks.

In the above-described example code, an error burst of 2-bit duration can be corrected by the decoder. If, however a burst error of duration greater than 2 bits occurs, the system is usually unable to correct that error and, in normal circumstances, requires a retransmission on the supposition that a similar burst will not reoccur. If the channel continues to be noisy, the only recourse is to continue to demand retransmission until the message is throughputted with only the maximum number of correctable errors.

In accordance with the present invention, however, once the noise characteristics of a channel have been determined by sampling, it is possible to predict when errors of bursts greater than the capability of the code, i.e., 2 in the above example, are being received. It is then necessary only to vary the adaptive parameter $a$, thereby automatically increasing the error correcting capabilities of the system. In this way, it is possible to readily increase the capability of the system in the above example to correct error bursts of duration 4 bits, 6 bits, 8 bits and up as the adaptive parameter $a$ is increased.

Numerous other advantages and features of the present invention will become readily apparent from the following detailed description of the invention, from one embodiment thereof, from the claims and from the accompanying drawings, in which each and every detail shown is fully and completely disclosed as part of the specification, in which like reference numerals refer to like parts, and in which:

Figure 1:
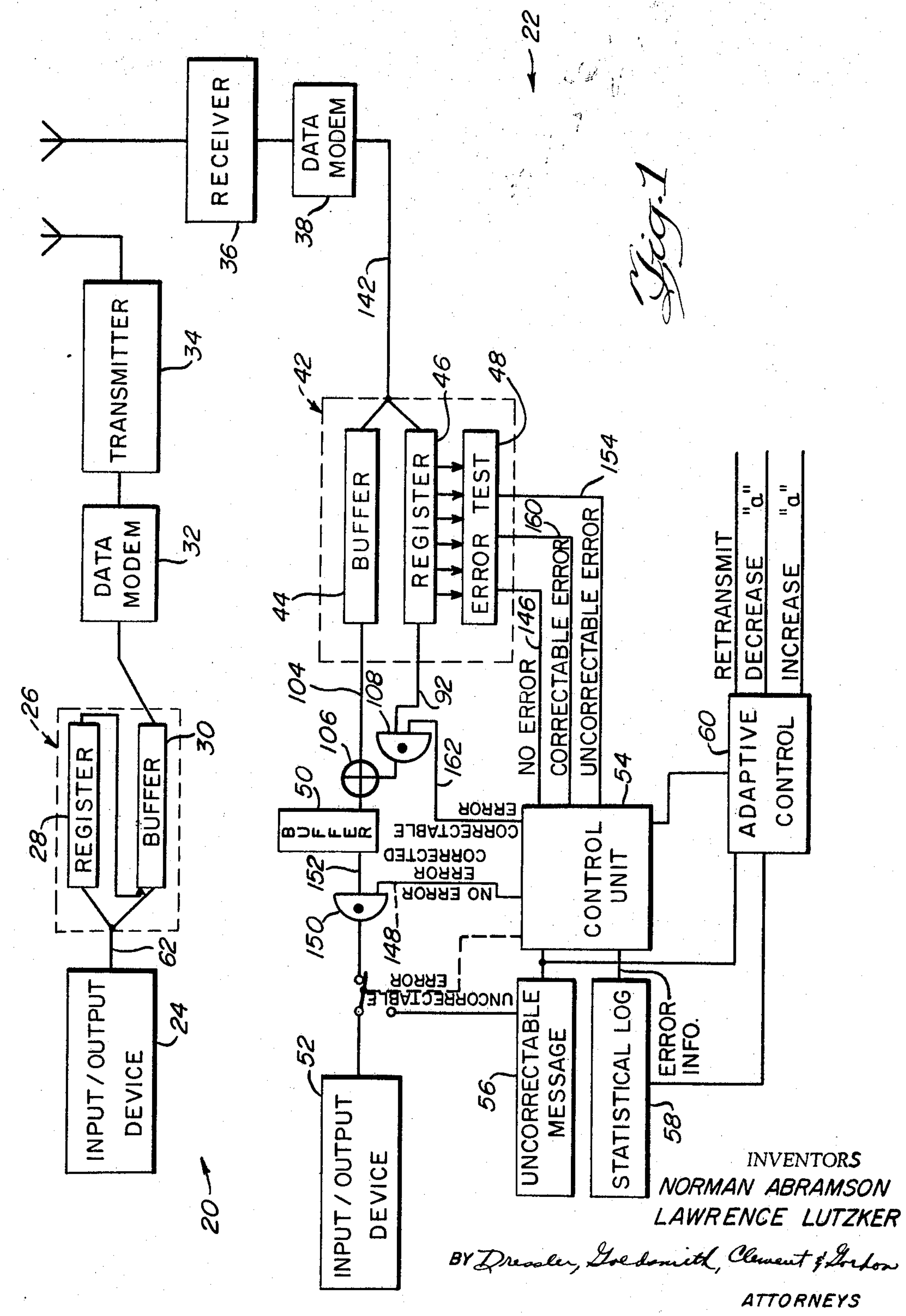
FIGURE 1 is a block diagram of an adaptive communications data processing system, incorporating the present invention.
Figures 2, 4, 5:
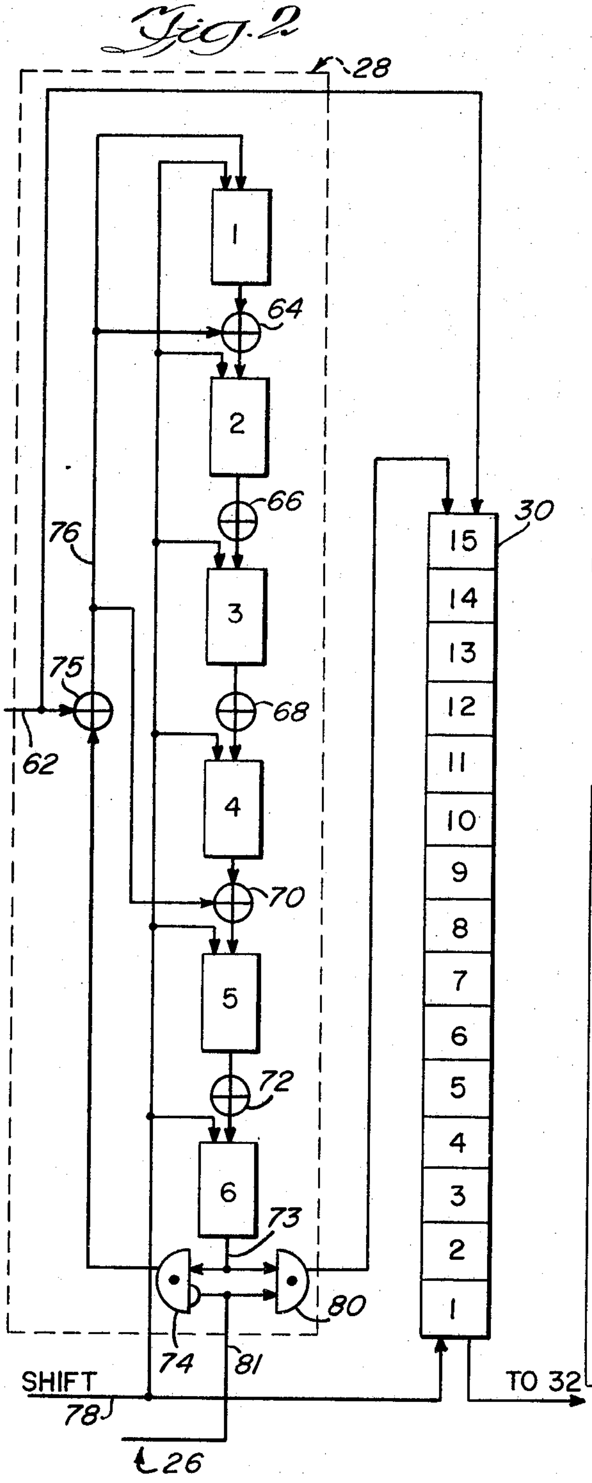
FIGURE 2 is a block diagram of an adaptive encoder subsystem suitable for use in the system of FIGURE 1 for $a=1$.
FIGURE 4 is a tabular representation of three binary words to be processed by the system of the present invention.
FIGURE 5 is a tabular representation of the three words of FIGURE 4 including redundant check bits encoded by the encoder of FIGURE 2.
Figures 3, 14:
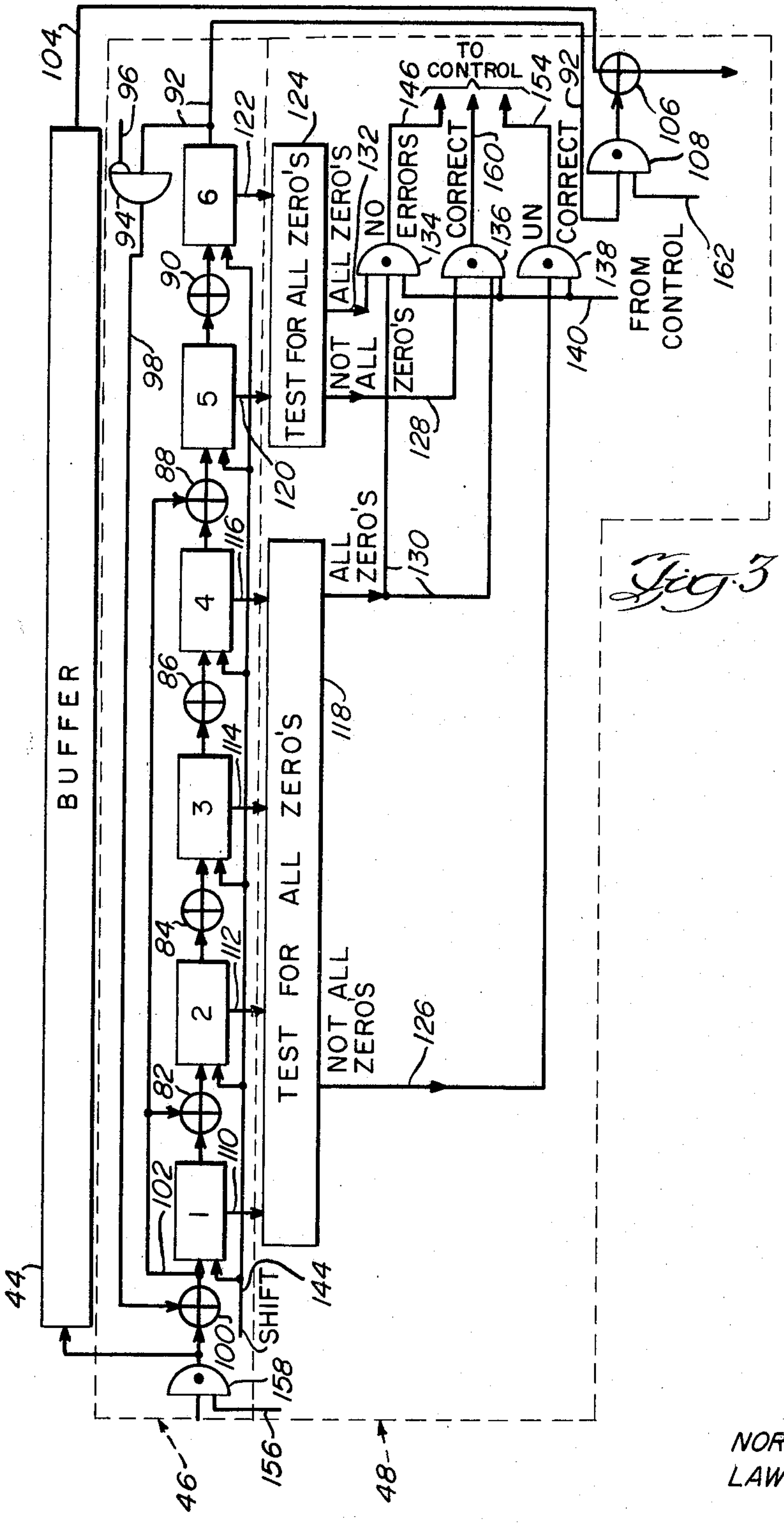
FIGURE 3 is a block diagram of an adaptive decoder subsystem suitable for use in the system of FIGURE 1 for $a=1$.
Figures 13, 15:
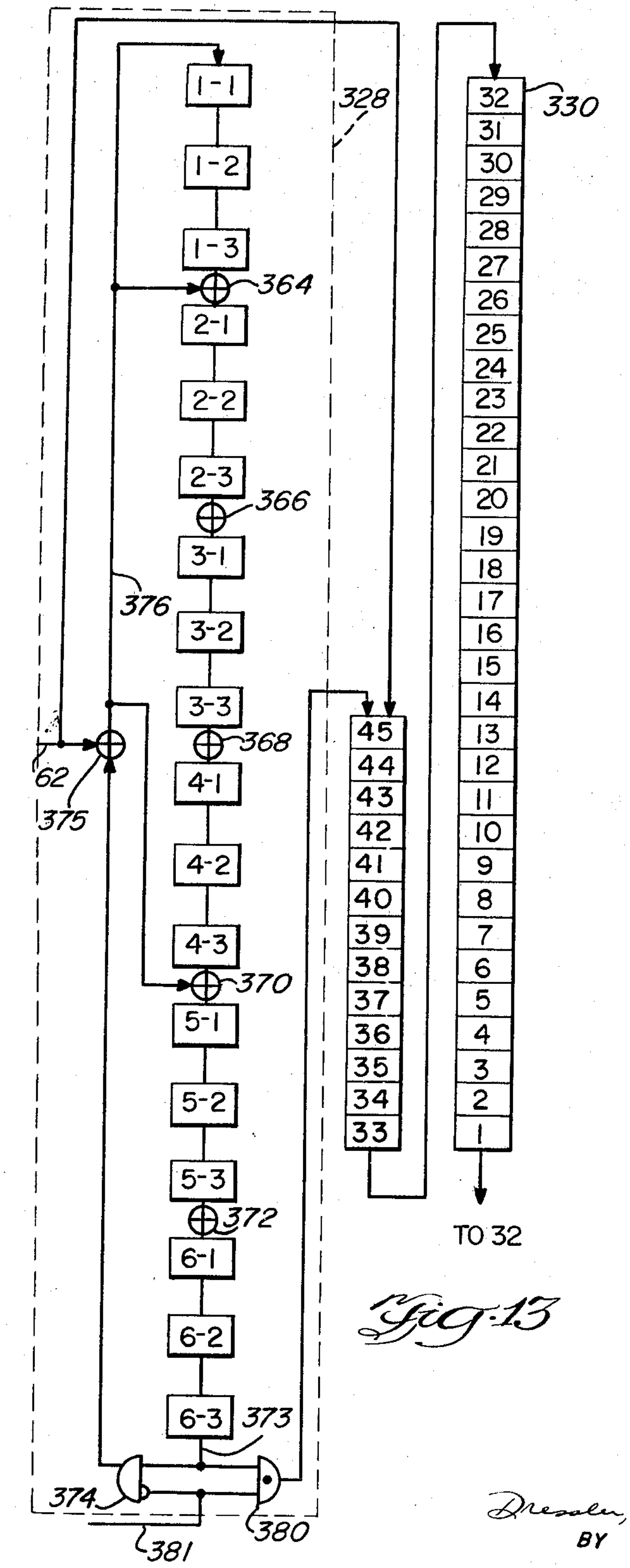
Figure 16:
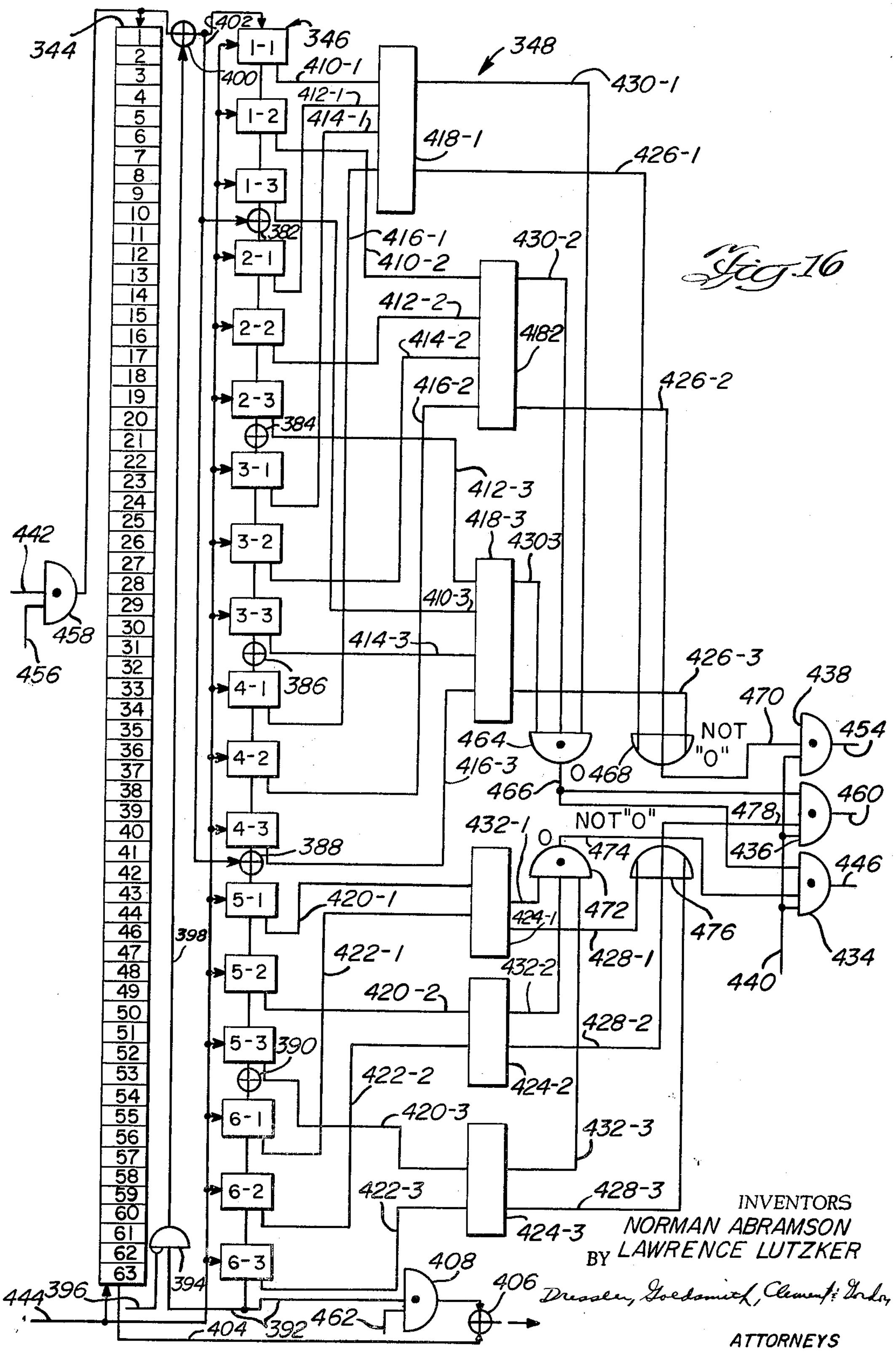
Figure 17C:
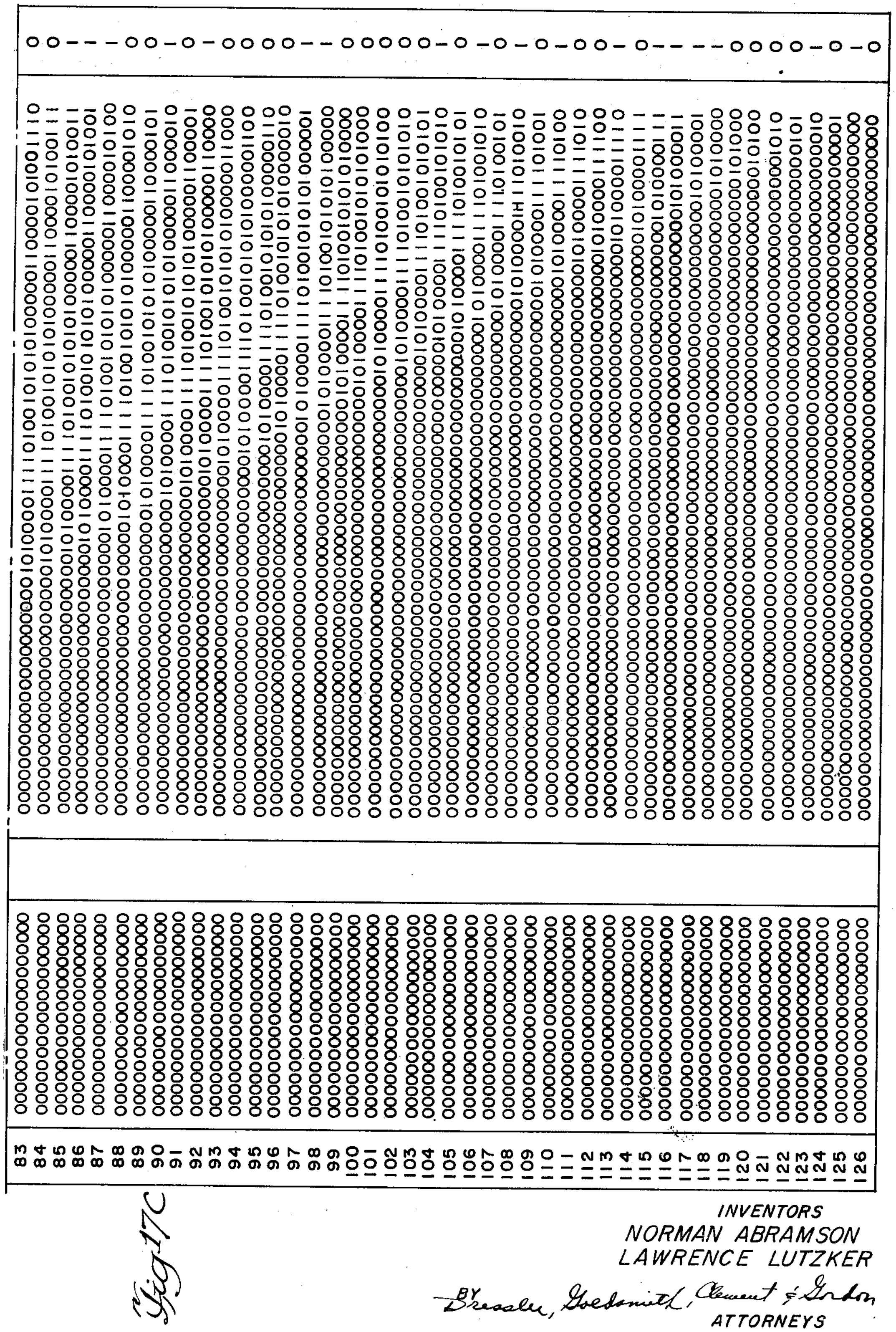
Figure 18B:
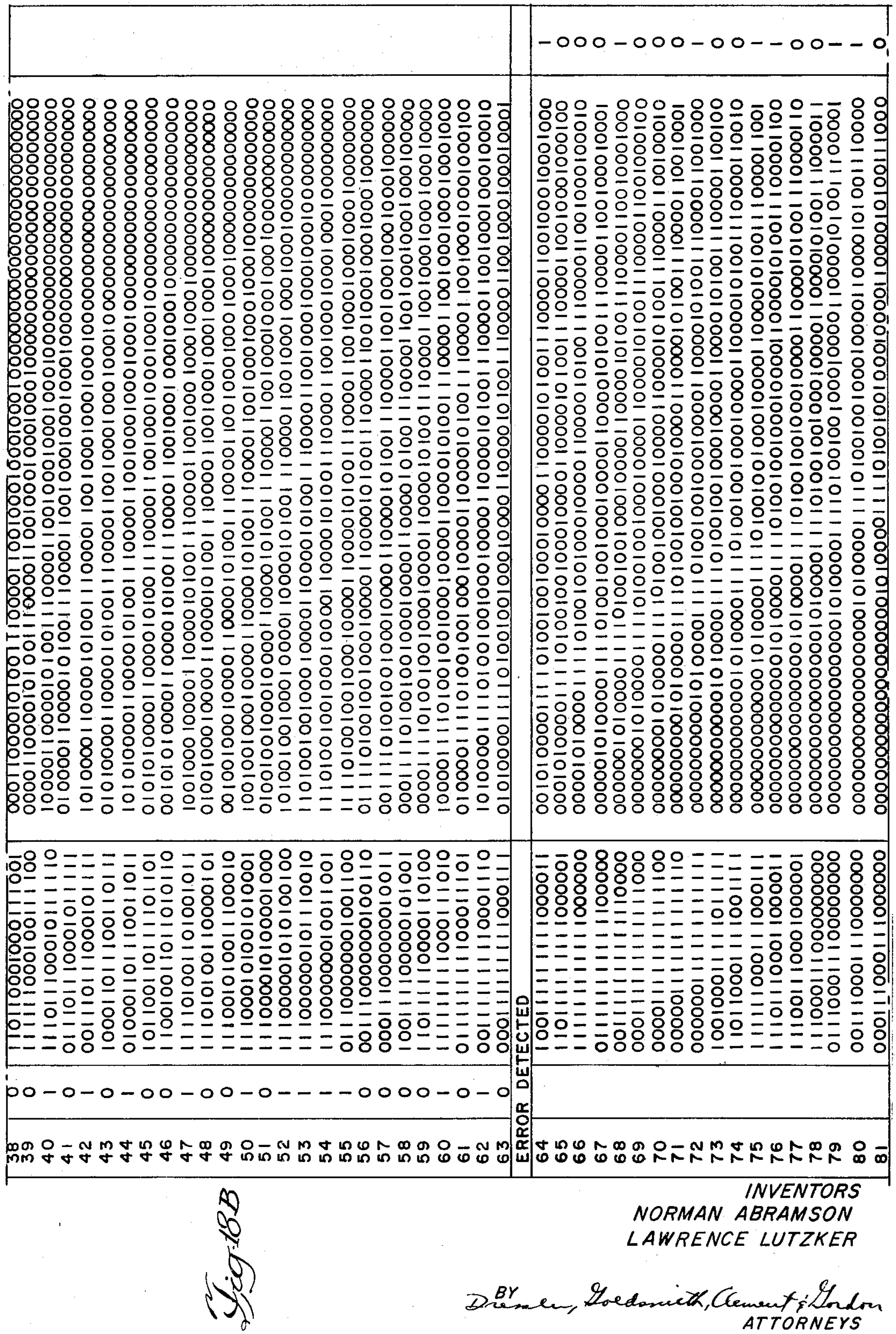
Figure 19:
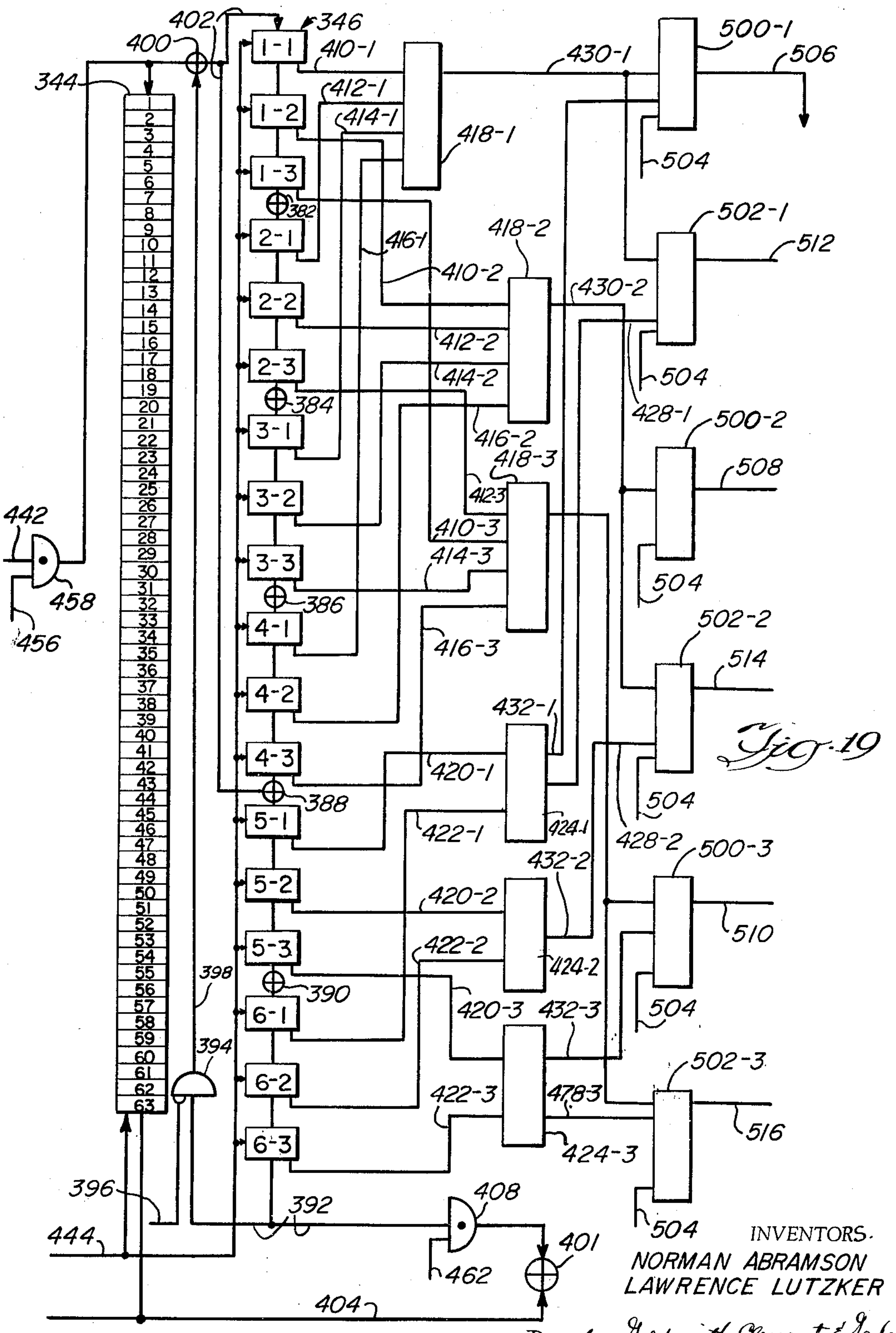

FIGURES 6($a$), ($b$) and ($c$), respectively, are tabular representations, showing the states of the encoding register and encoding buffer of FIGURE 2 at various times during the encoding procedure for the three words of FIGURE 4;

FIGURES 7(*a*), (*b*) and (*c*) are tabular representations of the states of the decoding register and decoding buffer of FIGURE 3 at various time during the decoding of the individual encoded words of FIGURE 5 when received with no error;

FIGURE 8 is a tabular representation showing the states of the stages of the decoding register and decoding buffer of FIGURE 3 at the various times during the decoding of WORD ONE of FIGURE 5 when received with an error burst of two-bit duration occurring at bit positions 5 and 6;

FIGURE 9 is a tabular representation showing the states of the stages of the decoding register and decoding buffer of FIGURE 3 at the various times during the decoding of WORD TWO of FIGURE 5 when received with an error burst of two-bit duration occurring at bit positions 19 and 20;

FIGURE 10 is a tabular representation showing the states of the stages of the decoding register and decoding buffer of FIGURE 3 at the various times during the decoding of WORD THREE of FIGURE 5 when received with an error burst of two-bit duration occurring at bit positions 1 and 2;

FIGURE 11 is a tabular representation of the states of the decoding shift register and decoding buffer of FIGURE 3 at the various times during the decoding of WORD TWO of FIGURE 5 when received with an uncorrectable error burst of three-bit duration occurring at bit positions 19, 20 and 21;

FIGURE 12 is a tabular representation of the states of the decoding shift register and decoding buffer of FIGURE 3 at the various times during the decoding of WORD THREE of FIGURE 5 when received with an uncorrectable error burst of three-bit duration occurring at bit positions 1, 2 and 3;

FIGURE 13 is a block diagram of the adaptive encoder subsystem of FIGURE 1 in which the potency of the encoder of FIGURE 2 has been adaptively increased by a factor of $a=3$;

FIGURE 14 is a tabular representation of a binary word to be processed by the system of the present invention and made up of a combination of the three individual words of FIGURE 4;

FIGURE 15 is a tabular representation of the word of FIGURE 14 including, in addition, redundant check data bits encoded by the circuitry of FIGURE 13;

FIGURE 16 is a block diagram of the adaptive decoder subsystem of FIGURE 1 in which the potency of the decoder of FIGURE 3 has been adaptively increased to decode words encoded for values $a=3$;

FIGURES 17(*a*), (*b*) and (*c*) are tubular representations showing the states of each stage and substage of the decoding register and decoder buffer of FIGURE 16 at the various times during the decoding of the encoded word of FIGURE 15 when received with no error;

FIGURES 18(*a*), (*b*) and (*c*) are tabular representations showing the states of each stage and substage of the decoding register and decoding buffer of FIGURE 16 at the various times during the decoding of the word of FIGURE 15 when received with an error burst of six-bit duration occurring at bit positions 39–45; and FIGURE 19 is an alternative embodiment of the decoder subsystem of FIGURE 16 showing the increased potency in its ability to correct errors within the subblocks for values of $a$ greater than 1.

While in the following specification, the present invention is described for use with a data transmission system, it is quite evident that the invention is suitable for use with other data processing, storing and communications systems. Furthermore, the data storage and transmission portions of the system do not form a part of the present invention and will not be described in detail, since those skilled in the art are familiar with their design and operation.

Referring to FIGURE 1 there is shown a suitable data transmission system encompassing the features of the present invention. The transmission system may be divided into a transmitting complex 20 and a receiving complex 22. The transmitting complex 20 includes a source of information, such as an input/output device 24 typically taking the form of magnetic tape, magnetic discs or magnetic drums; an encoder 26, including interconnected encoding register 28 and encoder buffer 30, for adaptatively encoding the data with redundant information in accordance with the present invention; a data modem 32 for converting or modulating the encoded message into suitable form for transmission; and a suitable transmitter 34 for transmitting the information to a remote station. The receiving complex 22 includes a receiver 36, a data modem 38 for demodulating or deconverting the received messages, a decoder 42 including a decoder buffer 44 and decoder register 46 similar to that found in the encoder 26 and error test and correction circuitry 48, all for detecting and correcting errors in a received message, an intermediate buffer 50, and an input/output device 52 for recording the messages received as decoded.

There is provided a control unit 54 for generating pulses to synchronize the operation of various components of the system which is also responsive to signals from the error test circuitry 48 representing the character of any errors in the received message for controlling the information received by the input/output device 52; an uncorrectable message generator 56 for noting in the input/output device 52 the fact that an uncorrectable message has been received; a statistical log 58 for sampling the character of the errors received, thereby providing information about the character of the transmission channel; and an adaptive control 60 responsive to the information provided by the statistical log 58 and control unit 54 for requesting retransmission of the erroneous message and for instructing both the encoder and decoder to increase or decrease the adaptive parameter $a$.

Referring to FIGURE 2, there is shown the encoder 26 connected for $a=1$ which performs the basic function of the system of operating on the binary information data bits supplied from the input/output device 24 to generate the appropriate redundant check data bits to be transmitted along with the information data bits. The output 62 from the input/output device 24 is connected to the input of the principal components of the encoder, the shift register and the encoder buffer.

Although the buffer is shown as a 15-stage register, any suitable device may be used. The output 62 from the input/output device 24 is connected to the input of stage 15 of the buffer 30 which is advanced as each additional bit enters stage 15 so when the entire word is entered, it is stored in stages 1–15 of the buffer.

The register is shown as having six stages interconnected by interstage exclusive OR-gates or MOD–2 adders 64, 66, 68, 70 and 72. The output 73 of the sixth stage is connected back to the input of the first stage through an INHIBIT-gate 74 and a stage 1 MOD–2 adder 75, the other input of which is connected to the input/output device 24. The output 76 of stage 1 MOD–2 adder 75, in addition to being connected to the input of stage 1, is connected to the input of stages 2 and 5 through the second inputs of the stage 2 and stage 5 interstage MOD–2 adders 64, 70, respectively. While feedback connections for interstage MOD–2 adders 66, 68 and 72 have been omitted for clarity, it should be understood that various feedback configurations may be used, depending upon the particular code being implemented. Each stage of the register is provided with a shift input 78 to transfer the bit stored therein to the next suceeding stage through an interstage MOD–2 adder. The ouput 73 of the sixth stage is also connected to the input of the buffer 30 through an AND-gate 80. When the entire 15-bit word has been entered into the buffer 30, a signal is provided on line 81 connected to the second input of INHIBIT-gate 74 and AND-gate 80 to open the feedback circuit to stage 1 and close the circuit between stage 6 and the buffer 30. Succeeding shift pulses cause the encoded 21-bit word to be read serially out of the buffer-register combination.

The design of the register 28, including the number of stages and the particular feedback and interstage connections, is governed by the code being used. If the code defined by the generator $g(x^a)=(x^{3a}+1)(x^{3a}+x^a+1)$, the block length of the entire message $n$ equals 21 for $a=1$, the number of information bits $k$ equals 15, and the number of redundant bits to be generated $r$ equals 6. The number of stages of the shift register equals the number of redundant bits to be generated.

It should be understood that words of 21-bit basic block length illustrated herein are utilized only as examples and that apparatus designed in accordance with the present invention can be utilized with words having block lengths of at least several thousand bits. In one suitable arrangement, the basic block length $n=1860$, and the polynomial to be satisfied by the encoder is $$g(x^a)=x^{65a}+x^{62a}+x^{60a}+x^{5a}+x^{2a}+1$$

To satisfy this equation the number of information bits $k=1795$ and the number of redundant bits $r=65$. Therefore, the shift register would be provided with 65 stages and would have a feedback and interstage input connections into stages 1, 3, 6, 61 and 63. As a matter of convenience, the present invention will be illustrated for a code having words of block length $n=21$, since the description of the system utilizing longer words would render the application unduly complex.

The decoder for $a=1$ is shown in more detail in FIGURE 3 and operates on the incoming message to determine the existence of an error and to either correct the error or to indicate when an uncorrectable error is received. The principal components of the decoder include a decoding buffer 44 and a decoding register 46. The decoding register 46 has six stages, the same number as the encoding register 28, which are interconnected by a plurality of interstage MOD–2 adders 82, 84, 86, 88 and 90. As explained above in relation to register 28, some feedback connections have been omitted for clarity.

The output 92 of the sixth stage is connected to an INHIBIT-gate 94, the inhibiting input 96 of which is a control signal from the control unit 54. The output 98 of the INHIBIT-gate 94 is connected to the input of stage 1 through the stage 1 MOD–2 adder 100. The output 102 of the stage 1 MOD–2 adder 100, in addition to being connected to the input of stage 1, is connected to the inputs of stages 2 and 5 through the stage 2 and stage 5 interstage MOD–2 adders, 82, 88, respectively. The particular feedback and interstage connections for the decoding register 46 are the same as those for the encoding register 28 and are altered to conform to the configuration of the encoding register.

The output 104 of the decoding buffer 44 is connected to the input of the intermediate buffer 50 through an error correction MOD–2 adder 106, the other input of which is connected to the output 92 of stage 6 through a two-input AND-gate 108.

In the present example, the "0" outputs 110, 112, 114 and 116 of stages 1, 2, 3 and 4 of the register 46 are connected to the inputs of a four-bit comparator or four-input NOR-gate 118 which tests to determine whether a "0" is present in each and every one of the four stages. The "0" outputs 120, 122 of stages 5 and 6 are connected to the inputs of two-bit comparator or two-input NOR-gate 124 which tests for all "0"s in stages 5 and 6. The four-bit and two-bit comparators 118, 124 each provide signals at one output 126, 128, respectively, when stages 1 through 4 and 5 and 6, respectively, do not contain all zeroes and provide signals on a second output 130, 132, respectively, when these stages do contain all zeroes.

The all-"0" output 130 of the four-bit comparator 118 and the all-"0" output 132 of the two-bit comparator 124 are connected to the inputs of a first three-input error-detection AND-gate 134, the "no error" AND-gate. The all-"0" output 130 of the four-bit comparator 118 and the not all-"0" output 128 of the two-bit comparator 124 are connected to the inputs of a second three-input error-detection AND-gate 136, the "correctable error" AND-gate. The not all-"0" output 126 from the four-bit comparator 118 is connected to one input of a two-input error detection AND-gate 138, the "uncorrectable error" AND-gate. The remaining input 140 of each of the error detection gates 134, 136, 138 is provided by a clock or sampling pulse from the control unit 54.

FIGURE 4 is a table of three words, WORD ONE, WORD TWO and WORD THREE, to be encoded, transmitted and decoded by the system and subsystems of FIGURES 1, 2 and 3. In order to appropriately encode each word for transmission, it is provided serially on the output line 62 of the input/output device 24 which, as seen in FIGURE 2, is connected to one input of the stage 1 MOD–2 adder 75, the output 76 of which is connected directly to stage 1 and to stages 2 and 5 of the encoding register 28 through interstage MOD–2 adders 64, 70. The output 62 from the input/output device is also connected to the input of stage 15 of the encoding buffer 30.

Since the other input to the stage 1 MOD–2 adder 75 (the feedback from stage 6), is "0" at time 1, the input into stages 1, 2 and 5 of the register 28 is the same as the initial bit of the message, in the case of WORD ONE, a "1." For WORD ONE, after the first time interval, the states of the six shift register stages is, as seen in FIGURE 6(*a*), 11001. At each succeeding time interval, a pulse on shift line 78 causes an additional bit from the input/output device 24 to be added modulo–2 with the output from stage 6, since the shift pulse simultaneously causes the information in each stage to be shifted to the right to the next succeeding stage. The result is entered into stage 1 of the shift register 28. In addition, the output 76 of the stage 1 MOD–2 adder 75 is added modulo–2 with the outputs of stages 1 and 4 in interstage MOD–2 adders 64 and 70, respectively, and the result entered into stages 2 and 5. This process is repeated until the entire 15-bit word is entered into the encoding buffer 30.

The tables of FIGURES 6(*a*), (*b*) and (*c*) indicate the states of the six stages of the shift register 28 for the 15 time intervals required to insert each entire 15-bit word into the buffer 30. At the end of the fifteenth time interval, the contents of the shift register 28 represent the appropriate redundant data check bits and the message has been fully encoded. A signal is then applied on line 81 to INHIBIT-gate 74 in the feedback circuit and to activate AND-gate 80 connecting the output of stage 6 to the input of the buffer 30. Shift pulses are again applied to both the register 28 and the buffer 30 to feed the fully encoded word serially out of the encoder 26 through the modem 32 for transmission. By reference to FIGURE 5, it is seen that each entire 21-bit message includes the 15-bit information word of FIGURE 4 plus the 6 redundant bits stored in the register at the end of time interval 15.

When the encoded, transmitted word is received at the receiver 36, it is demodulated or converted into decodable form by the data modem 38. The output 142 of the modem 38 is connected to the input of the decoder buffer 44 and to the input of the decoder register 46 through stage 1 MOD–2 adder 100. As indicated above, the output of the stage 1 MOD–2 adder 100 is also connected to the input of stage 2 through interstage MOD–2 adder 82, the other input of which is connected to the output of stage 1, and to the input of stage 5 through interstage MOD–2 adder 88, the other input of which is connected to the output of stage 4.

The decoder buffer 44 and decoder register 46 are designed to receive the 21-bit word from the data modem 38 serially, bit by bit. Each shift pulse on line 144 causes one bit to enter stage 1 of the register through the MOD–2 adder and simultaneously causes the information in each stage of the register to be shifted to the right to the next succeeding stage. During each shift operation the output 92 of stage 6 is fed back to the stage 1 input MOD–2 adder 100 through the feedback INHIBIT-gate 94 so long as a signal does not appear on the inhibit input 96 of the gate. This feedback signal is added modulo-2 to the output 142 from the modem 38. This cycle continues for 21 time intervals until the entire 21-bit word, including the 15 information data bits and the 6 redundant check data bits have been read into the register 46 and the decoder buffer 44.

FIGURES 7(*a*), (*b*) and (*c*) are tabular representations showing the states of the stages of the decoding shift register 46 for each of the 21 time intervals when the transmitted WORDS ONE, TWO and THREE, respectively, are received correctly. After the complete word has been read into the register 46 and buffer 44, i.e., after 21 time intervals, the state of the register 46 is sampled by pulsing the sample input 140 to each of the error-detection AND-gates 134, 136 and 138.

If there are no errors, a signal is present on each of the all-"0" lines 130, 132 of the four-bit and two-bit comparators 118, 124 and, therefore, a pulse appears on the output 146 of the "no error" AND-gate 134 connected to the control unit 54. In response to this pulse, the control unit applies a signal to one input 148 of the intermediate buffer output control gate 150, thereby connecting the output 152 of the buffer 50 directly to the input/output device 52.

If the message as received has an error therein, the operation of the decoder 42 is somewhat different after the word has been completely read into the register 46, since a "1" will be stored in at least one stage of the register 46 at the end of 21 time intervals. The "1" may be present in the group consisting of stages 1, 2, 3 and 4, or in the group consisting of stages 5 and 6, or in both groups. If a "1" is present in one of the first four stages, a signal is present on the not all-"0" output line 126 of the four-bit comparator 118. Thus, when the register 46 is sampled by pulsing the input 140 to each of the error-detection AND-gates 134, 136, 138, a pulse appears on the output 154 of the "uncorrectable error" AND-gate 138 connected to the control unit 54.

In response to this pulse, the signal from the control unit on line 156 to the register's input AND-gate 158 is discontinued to open that gate thereby disconnecting input line 142 from the register 46. The register 46 continues to cycle as long as a "1" remains in any of stages 1, 2, 3 or 4 with the output 92 of stage 6 being fed back to the input of stage 1 MOD–2 adder 100. Simultaneously with the recycling of the register 46, the information stored in the decoder buffer 44 is shifted out serially bit by bit through the error-correcting MOD–2 adder 106. Since the AND-gate 108 connecting the output 92 of stage 6 to the other input of the error-correcting MOD–2 adder 106 is not activated at this time, the information from the decoding buffer 44 passes to the intermediate buffer 50 unchanged.

Referring to FIGURE 8, there is shown a tabular representation of an example of this process wherein WORD ONE has been received with an error burst of two-bit duration occurring at bit positions 5 and 6. At the end of time interval 21, this error is indicated by the presence of "1's" in stages 1 and 2 which is indicated by the presence of a signal on the not all-"0" output line 126 of comparator 118. As explained above, the input to the register 46 is opened, and the register 46 continues to cycle as the information is read from the buffer 44 serially bit by bit. At the end of time interval 25, the first 4 bits, which were received correctly, have been read out of the decoder buffer 44 and, at the same time, the first 4 stages of the register 46 now contain all zeroes.

This is an indication that the error can be corrected, since a signal appears on the all-"0" output 130 of the four-bit comparator 118, while, at the same time, a signal appears on the not all-"0" output 128 of the two-bit comparator 124. When the next pulse appears on line 140 of the error-detection gates 134, 136, 138, an output pulse appears on the output line 160 of the "correctable error" AND-gate 136 connected to the control unit 54. In response to this pulse, the control unit 54 applies a signal to the inhibit input 96 of the INHIBIT-gate 94 connecting the output 92 of stage 6 back to the input of the stage 1 MOD–2 adder 100, thereby disconnecting this feedback circuit 98. Simultaneously, a signal from the control unit 54 is applied to the second input 162 of the AND-gate 108 connecting the output 92 of stage 6 to the error-correction MOD–2 adder 106.

Therefore, when the next shift pulse occurs during time interval 26, the "1" in stage 6 is shifted out of stage 6, a bit is shifted out of the decoder buffer, and these two bits are added modulo-2 in the error-correcting MOD–2 adder 106, thereby providing correct information at the input of the intermediate buffer 50 in place of the erroneous bit that has been stored at this point in the decoder buffer 44. The same step is repeated during time interval 27 since the error occurred for a burst of two bits. At the end of time interval 27, a signal will appear on the all-"0" outputs 130, 132 of both comparators 118, 124, thereby indicating that there are no errors remaining in the word and that the system may continue to function as if no errors had occurred.

FIGURES 9 and 10 are tabular representations similar to FIGURE 8 in which WORD TWO has errors occurring at bit positions 19 and 20 and WORD THREE has errors occurring at bit positions 1 and 2. In both instances, at the end of time interval 21, "1's" remain in at least one of the shift register stages. It can be seen that in FIGURE 9, the first four stages do not contain all "0's" until after time interval 39. As a result, the errors are corrected during time intervals 40 and 41 which, as can be seen by reference to FIGURE 9, correspond to bit positions 19 and 20 of the word being shifted out of the decoding buffer. In FIGURE 10, the error is corrected by the end of time interval 23, since the errors occurred in the first two bit positions.

When the message as received includes a burst of errors beyond the correction capacity of the system, the system operates initially the same as explained above. In this instance, however a "1" is always in at least one of the first four stages of the register after each of the time intervals 21–42, and, therefore, a signal is always present on the not all-"0" line 126 of the four-bit comparator 118. FIGURES 11 and 12 are tabular representations of this process wherein WORD ONE and WORD THREE, respectively, are shown with errors occurring as bursts of 3-bit duration at bit positions 19, 20, 21 of WORD TWO and at bit positions 1, 2, 3 of WORD THREE. As a result, when the error-correction AND-gates 134, 136, 138 are sampled, output pulses continue to appear at the output 154 of the "uncorrectable error" AND-gate 136.

At the end of the 42 time intervals, the control unit 54 signals the uncorrectable message generator 56 that an uncorrectable message was received and instructs it to record that information at the appropriate point in the input/output device 52. The control unit 54 also signals the adaptive control 60 to request retransmission of the message.

The advantages and potency of the adaptive feature of the present invention are now realized. It should be understood that during this time error information has been fed into the statistical log 58, which is programmed to analyze the character of the error information in terms of the probability that a message can be retransmitted correctly. If the statistics of the channel, as represented by the type and number of errors, indicate that error bursts of sufficient duration to disable the correction capabilities of the decoder are likely to occur during retransmission, the adaptive control 60 will receive a signal from the statistical log instructing it to request retransmission of words encoded at higher values of $a$.

Assume the instructions are to increase the value of $a$ from "1" to "3." The circuit connections of the encoder 26 are automatically altered by multipying the delay of each stage of the register 28 by a factor of 3 (the value of "$a$") and by multiplying the storage capacity of each stage by a factor of 3, so each stage can retain three bits of information. The effect of this increased delay is to multiply the effective length of the register 28 by a factor of 3, to multiply the block length of the word to be encoded by a factor of 3 and to multiply the number of redundant data bits by a factor of 3. This simple electrical alteration of the encoding and decoding circuitry, an adjustment which does not vary the code, and which does not vary the percentage redundancy of the code, multiplies the burst error-correction capability of the code by a factor of 3, from bursts of two-bit duration to bursts of six-bit duration.

This increased capability of the system is more readily understandable by referring to FIGURE 13 which shows the encoder 26 connected to encode a word of 45 information data bits with 18 redundant data bits. The principal components of the FIGURE 13 encoder 26 are again an encoding shift register 328 and an encoding buffer 330. The shift register 328 is shown as having six stages. Each stage has the capacity to store three bits, and a bit which enters the input of a given stage is stored or delayed for three time intervals before being shifted into the next stage. Each stage is interconnected by interstage exclusive OR-gates or MOD–2 adders 364, 366, 368, 370 and 372.

The increased delay and storage capacity of each stage is indicated in the drawings by incorporationg three substages for each stage, e.g., stage 1 includes substages 1–1, 1–2, 1–3. A signal entering stage 1 enters, substage 1–1, is shifted during successive time intervals to substages 1–2 and 1–3, and finally is shifted to stage 2–1 through the stage 2 interstage MOD–2 adder 364. Although the increased delay and storage capacity of each stage of the shift register 328 has been illustrated by increasing the number of substages, the invention should not be limited to this configuration. Other suitable delay configurations may also be used, such as for example, adjustable tapped delay lines or disc or drum memories with appropriate numbers of properly spaced read and write heads.

The output 373 of stage 6 is connected back to the input of stage 1 through an INHIBIT-gate 374 and through the stage 1 MOD–2 adder 375, the other input of which is connected to the input/output device 24. In addition to being connected to the input of stage 1, the output 376 of the stage 1 MOD–2 adder 375 is connected to the input of stages 2 and 5 through the stage 2 and stage 5 interstage MOD–2 adders 364, 370, respectively. The output from the input/output device is also connected to the input of the 45-stage buffer 330.

FIGURE 14 is a table of the 45-bit word to be encoded by the subsystem of FIGURE 13. It should be noted that the 45-bit word is, in actuality, WORDS ONE, TWO and THREE of FIGURE 4 arranged serially one after the other. In order to encode the 45-bit word, it is provided serially on output line 62 of the input/output device 24, through the stage 1 MOD–2 adder 375, the output 376 of which is connected as explained above to stage 1, 2 and 5 of the encoding register. The operation of the encoder for $a$=3 is substantially the same as for the $a$=1 encoder except that the word is not completely encoded until all 45 information data bits have been inserted into the register 328 and the buffer 330.

When the entire word has been fed into the buffer 330 and the register 328, i.e., after 45 time intervals, the contents of the register represent the appropriate redundant data check bits, and the message has been fully encoded. A signal is then applied on line 381 to the inhibit input of INHIBIT-gate 374, thereby opening the feedback circuit. The signal on line 381 also activates AND-gate 380 so continued shifting of the buffer 330 and register 328 reads the entire 63-bit word into the modem 32 and the transmitter 34. FIGURE 15 is a tabular representation of the entire 63-bit message, including the 45 information bits of FIGURE 14, plus the 18 redundant bits stored in the register at the end of time interval 45.

The decoder for $a$=3 is shown in detail in FIGURE 16. The decoder for $a$=3 is essentially the same as the decoder for $a$=1. However, the register 346 and buffer 344 include the additional substages connected in an arrangement identical to that of the encoder.

Thus, the decoding register 346 is provided with 6 stages, each of which has the capacity of storing three bits of information. Stage 1 includes substages 1–1, 1–2 and 1–3 and each succeeding stage includes similar components. As explained above, each stage is connected by interstage MOD–2 adders 382, 384, 386, 388 and 390, and the output 392 of stage 6, substage 6–3, is connected to one input of a stage 1 MOD–2 adder 400 through feedback INHIBIT-gate 394. The other input of the stage 1 MOD–2 adder 400 is connected to the output of a two-input AND-gate 458 which, in turn, receives the incoming message from the modem 38. The output of the stage 1 MOD–2 adder 400 is connected to the input of stage 1, substage 1–1, and is also connected to the input of stages 2 and 5 through the stage 2 and stage 5 interstage MOD–2 adders 382, 388, respectively.

The error test circuitry including four-bit comparators 418–1, 418–2, 418–3, two-bit comparators 424–1, 424–2, 424–3, error test AND-gates 434, 436, 438 and error correction MOD–2 adder 406 are connected to the decoder in the same relationship as similar circuitry in the $a$=1 decoder shown in FIGURE 3. However, due to the increased number of substages, additional comparator circuits are provided, one for each additional set of substages. Thus, the "0" outputs from substages 1–1, 2–1, 3–1 and 4–1 (410–1, 412–1, 414–1, 416–1, respectively) are connected to the substage 1 four-bit comparator 418–1. The "0" outputs from substages 1–2, 2–2, 3–2 and 4–2 (410–2, 412–2, 414–2, 416–2, respectively) are connected to the input of substage 2 four-bit comparator 418–2, and the "0" outputs of substages 1–3, 2–3, 3–3 and 4–3 (410–3, 412–3, 414–3, 416–3, respectively) are connected to the inputs of substage 3 four-bit comparator 418–3.

Similarly, the "0" outputs from substages 5–1 and 6–1 (420–1, 422–1, respectively) are connected to the input of a substage 1 two-bit comparator 424–1, the "0" outputs from substages 5–2 and 6–2 (420–2, 422–2, respectively) are connected to the input of substage 2 two-bit comparator 424–2, and the "0" outputs from substages 5–3 and 6–3 (420–3, 422–3, respectively) are connected to the input of a substage 3 two-bit comparator 424–3.

Each of the four-bit comparators 418–1, 418–2, 418–3 provides a signal on an all-"0" output line 430–1, 430–2, 430–3, respectively, when each of the substages connected thereto contain a "0." The all-"0" outputs 430–1, 430–2, 430–3 of each of the four-bit comparators 418–1, 418–2, 418–3 are connected to the input of a four-bit all-"0" AND-gate 464, which will provide a signal on its output 466 only when all the substages of the first four stages contain "0's." The not all-"0" outputs 426–1, 426–2, 426–3 of the four-bit comparators 418–1, 418–2, 418–3 are connected to the inputs of a four-bit not all-"0" OR-gate 468 which will provide a signal on its output line 470 whenever any of the substages of the first four stages contain a "1."

Each of the two-bit comparators 424–1, 424–2, 424–3 also provide an output on an all-"0" line 432–1, 432–2, 432–3, respectively, when the substages connected thereto all contain "0's" and provide an output on a not all-"0" line 428–1, 428–2, 428–3, respectively, when any of the substages connected thereto contain a "1." The "0" output lines 432–1, 432–2, 432–3 of the two-bit comparators 424–1, 424–2, 424–3 are connected to the input of a two-bit all-"0" AND-gate 472 which has a signal at its output 474 only when all the substages of stages 5 and 6 contain "0's." The not all-"0" outputs 428–1, 428–2, 428–3 of the two-bit comparators 424–1, 424–2, 424–3 are connected to the inputs of a two-bit not all-"0" OR-gate 476 which provides a signal at its output 478 when any of the substages of stages 5 and 6 contain a "1."

The output 466 of the four-bit all-"0" AND-gate 464 and the output 474 of the two-bit all-"0" AND-gate 472 are connected to two inputs of a first three-input error-detection AND-gate 434, the "no errors" AND-gate. The output 466 of the four-bit all-"0" AND-gate 464 and the output 478 of the two-bit not all-"0" OR-gate 476 are connected to two inputs of a second three-input error-detection AND-gate 436, the "correctable error" AND-gate. The output 470 of the four-bit not all-"0" OR-gate 468 is connected to one input of a two-input error-detection AND-gate 438, the "uncorrectable error" AND-gate. The other input 440 of each of the error-detection AND-gates 434, 436, 438 is connected to the control unit to receive sampling pulses therefrom.

In operation the decoder buffer 344 and decoder register 346 receive the 63-bit word serially, bit by bit. Each shift pulse on line 444 causes one bit to enter stage 1, substage 1–1, of the register 346 through the MOD–2 adder 400 and, simultaneously, causes the bit of information stored in each substage of the register to be shifted to the next succeeding substage. During each shift operation the output 392 of stage 6, substage 6–3, is fed back to one input of the stage 1 MOD–2 adder 400 through the feedback INHIBIT-gate 394 so long as a signal does not appear on the inhibit input 396 of that gate. This feedback signal 398 is added modulo-2 to the incoming message. This cycle continues for 63 time intervals until the entire 63-bit word, including the 45 information data bits and 18 redundant data bits, has been read into the register 346 and decoder buffer 344.

FIGURE 17 is a tabular representation showing the states of each stage and substage of the decoding shift register 346 and decoding buffer 344 for each of the 63 time intervals during which the 63-bit word, which has been received correctly, is being read into the decoder. When the complete word has been read into the register and buffer, each stage of the register contains a "0." Therefore, signals appear on the all-"0" output lines 430–1, 430–2, 430–3 of each four-bit comparator 418–1, 418–2, 418–3, respectively, and on the all-"0" output lines 432–1, 432–2, 432–3 and each two-bit comparator 424–1, 424–2, 424–3, respectively. This causes a signal to appear at the outputs 466, 474, respectively, of the four-bit all-"0" AND-gate 464 and the two-bit all-"0" AND-gate 472 connected to the inputs of the "no errors" error-detection AND-gate 434. When the error-detection AND-gates are sampled, a pulse will appear on the output 446 of the output of the "no errors" AND-gate 434 connected to the control unit 54. In response to this pulse the signal from the control unit 54 to the input 456 of AND-gate 458 will be discontinued to disconnect any incoming signal from the register. Simultaneously, a signal is applied to the inhibit input 396 of the feedback INHIBIT-gate 394, thereby disconnecting the feedback circuit 398, and a signal is applied to one input of control gate 150 to allow the buffer 344 to be read out through the error-correction MOD–2 adder 406 and the intermediate buffer 50 directly to the input/output device 52.

If the message as received includes an error, the decoder operates differently once the 63-bit word has been read completely into the register 346 and buffer 344. Referring to FIGURE 18, there is shown a tabular representation showing the states of each stage and substage of the decoding register 346 and buffer 344 if a word containing an error therein is read into the decoder and subsequently corrected.

It can be seen that at the end of time interval 63, certain substages of the register contain "1's." In this instance, since the substages in stages 2, 3 and 4 contain "1's," a signal will occur on the not all-"0" lines 426–1, 426–2, 426–3 of the four-bit comparators 418–1, 418–2, 418–3, respectively, and, as a result, on the output 470 of the four-bit not all-"0" OR-gate 468. Thus, when the error-detection gates are sampled, a pulse appears on the output line 454 of the uncorrectable error AND-gate 438 connected tu the control unit.

In response to this signal the control unit opens the input gate 458 as described above, but does not inhibit the feedback INHIBIT-gate 394. The control unit causes the register 346 to continue to cycle with the output 392 of substage 6–3 fed back into one input of stage 1 MOD–2 adder 400. After each time interval, the error-detection AND-gates are sampled. By reference to FIGURE 18, it can be seen that a "1" remains in at least one substage of the first four stages at the end of each time interval through and including time interval 101. Therefore, a signal continues to appear on the uncorrectable error output line 454 each time the error-detection AND-gates are sampled.

At the end of time interval 102, however, each substage of the first four stages contains a "0." A signal now appears at the output 466 of the four-bit all-"0" AND-gate 464 connected both to the "correctable error" and the "no errors" detection AND-gates 434, 436, respectively. Since "1's" are still retained in the substages of stages 5 and 6, a signal appears at the output 478 of the two-bit not all-"0" AND-gate 476 connected to the "correct error" AND-gate 436.

When the detection AND-gates are samples at this point, a pulse appears on the output line 460 of the "correctable error" AND-gate 436 connected to the control unit. In response to this pulse, a signal is applied to the inhibit input 396 of the feedback INHIBIT-gate 394, thereby disconnecting the feedback circuit, and a signal is also applied to one input 462 of a stage 6 AND-gate 408, the other input of which is connected to the output 392 of substage 6–3. When the next shift pulse occurs, the bit which is shifted out of the buffer 344 and the bit shifted out of substage 6–3 are added modulo-2 in the error correction MOD–2 adder 406 and inserted into the intermediate buffer 50. The modulo-2 addition corrects the erroneous bit of the received message stored at that point in the buffer 344. This cycle continues until the last "1" is read out of the register 346, thereby correcting all the errors that occurred in the received message.

When all the errors have been corrected, the register again contains all "0's," and signals appear at the output 436 of the "no error" detection AND-gate 434. The operation of the system will then revert to "no error" operation as described above.

Since, as has been mentioned above, the system for factors of *a* greater than 1 effectively distributes a burst of errors into each sub-block, the increased potency of a system incorporating the adaptive features of the present invention may be utilized to perform other decoding operations. As an example, reference is made to FIGURE 19 in which the decoder of FIGURE 16 is connected to supplemental circutry that allows for the correction and detection of errors occurriny in each sub-block even when when the total error burst exceeds the error correction capabilities of the entire system. While part of the circuitry of FIGURE 16 has been omitted from FIGURE 19 for clarity, it should be understood that these capabilities supplement the basic error correction operation of the system and do not replace it.

In the FIGURE 19 embodiment, the all-"0" output lines 430–1, 430–2, 430–3 of the four-bit comparators 418–1, 418–2, 418–3, respectively, are each connected to one input of a sub-block "no-error" indicator 500–1, 500–2, 500–3, respectively. The all-"0" output lines 430–1, 430–2, 430–3 are also connected to one input of sub-block "correctable-error" indicators 502–1, 502–2, 502–3, respectively.

The all-"0" output lines 432–1, 432–2, 432–3 of the two-bit comparators 424–1, 424–2, 424–3, respectively, are connected to a second input of the sub-block "no-error" indicators 500–1, 500–2, 500–3, respectively, while the not all-"0" outputs 428–1, 428–2, 428–3 of the two-bit comparators are connected to the second inputs of the sub-block "correctable-error" indicators 502–1, 502–2, 502–3, respectively. The third input 504 to each of these indicators is provided by a sampling pulse from the control unit 54.

The basic operation of the system is the same as that described for the system of FIGURE 16. Thus, after the entire 63-bit word has been read into the decoder, the state of each substage of the register 346 is sampled as explained above. If the received message includes an error, a single will appear on a not all-"0" output line of at least one of the four-bit comparators 418–1, 418–2, 418–3 or two-bit comparators 424–1, 424–2, 424–3. As explained above, as long as the error is uncorrectable, a signal will appear on the not all-"0" output line of one of the four-bit comparators.

Even if the error burst is sufficiently long to exceed the capacity of the entire system, its pattern may be such as to allow for location and correction of errors within one or more individual sub-blocks.

In order to determine whether any sub-block does contain a correctable error, a sampling pulse is also applied to the sub-block indicators on line 504 after the entire 63-bit word has been read into the register. If the sub-block stored in substages 1–1 . . . 6–1 contains no errors, signals will appear on all-"0" output lines 430–1 and 432–1 at this time. When the sampling pulse is applied to the third input 504 to the sub-block indicators, a pulse will appear on output line 506 of the "no-error" indicator 500–1. Similarly, if the sub-blocks stored in substages 1–2 . . . 6–2 or 1–3 . . . 6–3 do not contain errors, then a pulse will appear on output lines 508 and 510 of the sub-block "no-error" indicators 500–2, 500–3, respectively, when sampled.

On the other hand, if a correctable error appears in any of the sub-blocks, a pulse will appear on output lines 512, 514 or 516 of the sub-block "correctable-error" indicators 502–1, 502–2, 502–3, respectively, depending upon which sub-block contains the correctable error. A sampling pulse is thereafter applied to line 504 only after each $a$th shift pulse or, in the present example, only after every third shift pulse. This is because the same sub-block of information is stored in the same set of substages only after each $a$th shift pulse.

If after the completion of the entire decoding operation, there is an indication that the entire block of 63 bits contained an uncorrectable error, the state of each sub-block indicator is sampled to determine whether any sub-block was received error free or contained a correctable error. If this is the case, the 63-bit word can be read out of buffer 50 back into the decoder which has been reset.

If a sub-block contains a correctable error, the decoding operation is repeated. When a pulse appears on the output line of the appropriate sub-block "correctable-error" indicator, the control unit of the system will, thereafter, operate as described above, but only for the indicated sub-block, to add modulo-2 the output of the register 346 with the output of the buffer 344 to correct the error in the sub-block. If the sub-block does not contain an error, it can be read out into the input/output device 52.

Thus, as shown by the above examples, without increasing the redundancy or reducing efficiency, it is possible to correct an error burst of 6-bit duration simply by increasing the adaptive parameter $a$, whereas without the adaptive feature of the present invention, successful decoding of a message incorporating the three words would mean retransmission of two out of three words. Since the value of this adaptive factor $a$ is varied after sampling the noise statistics of a channel, or in accordance with any other desired function, the amount of retransmission is reduced to a minimum, the redundancy of a basic code is kept low and the efficiency of the overall data processing or communications system is increased.

Furthermore, the amount of retransmission may be reduced even further by more fully utilizing the adaptive coding procedures and the interleaving of the errors through a plurality of sub-blocks. Since the same code is utilized independent of the value of the adaptive parameter $a$, it is possible to correct or detect errors in the sub-blocks even though the total error burst is uncorrectable for a given value of $a$. Thus, the amount of information to be retransmitted is reduced even further.

It can be seen that by the present invention a system has been provided in which error correction capabilities can be adaptively increased without varying the code and without increasing the basic complexity of the system. Furthermore, although the system of the present invention has been illustrated for use in the case of a generator polynomial $g(x)=(x^3+x+1)(x^3+1)$, it is clear that it is adaptable for use with other generator polynomials and other codes. The system may be utilized, for example, with "Fire" codes, "BCH" codes, "Product" codes, "Reed-Solomon" codes and others.

Furthermore, not only is the adaptive coding system of the present invention capable of increasing the effectiveness of all of these codes in error correction, but with the various configurations of combinatorial logic available and possible, can increase the uses to which such codes could be put. In one example, this is accomplished by effectively interleaving the redundant check data bits through out a block of information, by adaptively combining such sub-blocks through which the check data bits are interleaved and by adaptively checking, in addition to the various lengths blocks, the sub-blocks which form the total block of information.

Although, for the sake of simplicity, the encoder and decoder for $a=1$ have been shown separately from each other and from the circuitry for $a=3$, it should be understood that the circuits may be combined within the system. Furthermore, although the circuits of the transmitting and receiving complex have been illustrated as separate installations, it should also be understood that at any one location such circuits could be combined and used in duplex overlapping operation.

What is claimed is:

1. A digital data processing system for communicating information in the form of digital data bits comprising encoding means responsive to a first plurality of data bits for generating as a function thereof a second plurality of data bits in accordance with a selected error correcting code, the combination of said first and second pluralities of data bits comprising a first block of data bits, decoding means responsive to said first block of data bits for detecting errors occurring therein, for correcting up to a maximum number of said errors, said maximum number being defined by said code, and for extracting said first plurality of data bits from said first block of data bits; and means responsive to the detection of more than said maximum number of errors for adaptively modifying said encoding means and said decoding means by a factor of $a$, where $a$ is an integer $>1$, said modified encoding means responsive to $a$ times said first plurality of data bits for generating as a function thereof $a$ times said second plurality of data bits in accordance with said error correcting code, the combination of said $a$ times said first plurality of data bits and said $a$ times said second plurality of data bits comprising a second block of data bits and said modified decoding means responsive to said second block of data bits for detecting errors occurring therein, for correcting up to $a$ times said maximum number of said errors and for extracting said $a$ times the first plurality of data bits from said second block of data bits.

2. A digial data processing system for communicating information in blocks of digital data bits comprising encoding means responsive to $a.x$ information data bits for generating as a function thereof $a.y$ redundant check data bits in accordance with an error correcting code wherein $$\frac{y}{x+y}$$

equals a constant and $a$ is an integer$\geqq$1, means for receiving a combination of said $a.x$ information data bits and said $a.y$ redundant check data bits and for extracting the original $a.x$ information data bits therefrom including means for detecting errors occurring in the combination of $a.x$ and $a.y$ data bits and for correcting up to $a.z$ errors occurring in said combination, and means responsive to the detection of more than $a.z$ errors for increasing the value of $a$ until the new value of $a.z$ is greater than the number of errors detected, whereby the errors may be corrected.

3. The system of claim 2 in which said encoding and decoding means include register means having $y$ discrete stages each stage of said register having a storage capacity and a delay of $a$ bits.

4. A digital data processing system for communicating information in blocks of digital data bits comprising means for encoding $a.n$ data bits including $a.x$ information data bits and generating as a function thereof $a.y$ redundant check data bits in accordance with an error correcting code wherein $a$ is an integer$\geqq$1, means for receiving and decoding said $a.n$ data bits including means for detecting correctable and uncorrectable errors occurring in the received $a.n$ data bits, means for correcting the correctable errors, occurring in the received $a.n$ data bits, and means responsive to the detection of the uncorrectable errors for adaptively increasing the value of $a$ until the uncorrectable errors detected become correctable, and means for instructing said encoding means to re-encode said $a.n$ data bits for said increased values of $a$ whereby said detected errors may be corrected.

5. The system of claim 4 including means activated when $a$>1 for sampling groups of $n$ data bits to detect the absence of errors therein, and means for extracting each such group of $n$ data bits received without error from said received $an$ data bits.

6. The system of claim 4 in which said encoding means include register means having $y$ stages interconnected for generating $a.y$ redundant check data bits in response to said $a.x$ information data bits, said decoding means includes register means having $y$ stages interconnected in the same configuration as the register means of said encoder, said decoding means including means for indicating the absence of errors, the presence of correctable errors or the presence of uncorrectable errors in said received $a.n$ data bits.

7. The system of claim 6 in which said indicating means includes means coupled to said decoder register means for sampling the states of said $y$ stages said sampling means responsive to one state of said register means for indicating the presence of correcting means and responsive to another state of said register means for indicating the presence of uncorrectable errors and for adaptively enabling said instructing means.

8. The system of claim 7 in which said sampling means includes means responsive to said other state of said register means when $a$>1 for detecting the absence of errors and occurrence of correctable errors in each of $a$ groups of $n$ data bits, and means responsive to the presence of correctable errors in each such group of $n$ data bits for enabling said error correcting means only for that group of $n$ data bits.

9. A digital data processing system comprising means for encoding a block of data for communication over a transmission channel including means for generating $y$ redundant data bits from $x$ information data bits in accordance with an error correcting code, means for receiving the block of data communicated and for correcting errors occurring in said block of data, means for detecting transmission characteristics of the channel, and means responsive to selected values of said characteristics for encoding $a$ blocks of data wherein $a$ is an integer$\geqq$1 including means for generating $a.y$ redundant data bits from $a.x$ information data bits in accordance with said error correcting code.

10. The system of claim 9 in which said means for detecting transmission characteristics of the channel includes means for detecting the presence of uncorrectable errors in said received block of data, and said means responsive to said selected values of said characteristics includes means responsive to the presence of uncorrectable errors in said received block of data for encoding $a$ blocks of data.

References Cited

UNITED STATES PATENTS 3,372,376 3/1968 Helm ------------ 340—146.1

MALCOLM A. MORRISON, Primary Examiner

R. S. DILDINE, Jr., Assistant Examiner

PO-1050
(5/69)

UNITED STATES PATENT OFFICE
CERTIFICATE OF CORRECTION

Patent No. 3,506,961 Dated April 14, 1970

Inventor(s) N. Abramson et al

It is certified that error appears in the above-identified patent and that said Letters Patent are hereby corrected as shown below:

Col. 2, line 27, "these" should be --those--; line 32, "relationship" should be --relationships--; line 67, "perfor" should be --perform--. Col. 4, line 4 "polynominial" should be --polynomial--; line 13, "polynominial" should be --polynomial--; Col. 6, line 74, "suceeding" should be --succeeding--. Col. 8, line 36, "11001" should be --110010--. Col. 10, line 50, "capacity" should be --capability--. Col. 11, line 40, "incorporationg" should be --incorporating--. Col. 14, line 73, "occurriny" should be --occurring--. Col. 18, line 15, after "of" insert --correctable errors and for enabling said error--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents